US012688610B2

(12) United States Patent
Qiu et al.

(10) Patent No.: US 12,688,610 B2
(45) Date of Patent: Jul. 21, 2026

(54) CCD CAMERA CALIBRATION SYSTEM, METHOD, COMPUTING DEVICE AND STORAGE MEDIUM

(71) Applicant: CONTEMPORARY AMPEREX TECHNOLOGY (HONG KONG) LIMITED, Hong Kong (CN)

(72) Inventors: Guijia Qiu, Ningde (CN); Jinghua Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 317 days.

(21) Appl. No.: 18/412,624

(22) Filed: Jan. 15, 2024

(65) Prior Publication Data

US 2024/0153141 A1 May 9, 2024

Related U.S. Application Data

(63) Continuation of application No. PCT/CN2021/135305, filed on Dec. 3, 2021.

(51) Int. Cl.
*G06K 9/00* (2022.01)
*G06T 7/80* (2017.01)
(Continued)

(52) U.S. Cl.
CPC ............... *G06T 7/80* (2017.01); *G06V 10/44* (2022.01); *G06V 10/761* (2022.01); *H04N 25/71* (2023.01)

(58) Field of Classification Search
CPC . G06T 7/80; G06T 2207/30208; G06T 7/337; G06T 7/73; G06V 10/44; G06V 10/761
See application file for complete search history.

(56) References Cited

U.S. PATENT DOCUMENTS

| | | | |
|---|---|---|---|
| 7,889,234 B2 * | 2/2011 | Williams | G06T 7/80 |
| | | | 348/241 |
| 9,734,419 B1 * | 8/2017 | Ye | G06T 7/85 |

(Continued)

FOREIGN PATENT DOCUMENTS

| | | | | |
|---|---|---|---|---|
| CA | 2961921 A1 * | 9/2017 | | |
| CN | 106982370 A * | 7/2017 | | H04N 17/002 |

(Continued)

OTHER PUBLICATIONS

Multi-Camera Calibration, Peter Todorov, May 2019, pp. 1-47 (Year: 2019).*

(Continued)

*Primary Examiner* — Jayesh A Patel
(74) *Attorney, Agent, or Firm* — K&L Gates LLP

(57) ABSTRACT

The embodiments of the present disclosure provide a CCD camera calibration system, method, device, computing device, and storage medium. The system includes: a transport mechanism; a calibration component disposed on the transport mechanism and provided with multiple calibration pattern units arranged in a length direction of the calibration component, the calibration pattern unit including a first calibration block, which includes a positioning identifier and multiple first calibration patterns uniformly arranged; a CCD camera for photographing the calibration component to obtain a first image while the calibration component is travelling; a processing module, which is in communication connection with the CCD camera, and is adapted to calculate a transformation matrix of internal and external parameters of the CCD camera based on the first image.

17 Claims, 9 Drawing Sheets

(51) Int. Cl.

| | |
|---|---|
| *G06V 10/44* | (2022.01) |
| *G06V 10/74* | (2022.01) |
| *H04N 25/71* | (2023.01) |

(56) References Cited

U.S. PATENT DOCUMENTS

| | | | | |
|---|---|---|---|---|
| 10,148,944 | B2 * | 12/2018 | Lee | H04N 17/002 |
| 10,269,140 | B2 * | 4/2019 | Dubout | G06V 10/757 |
| 10,445,898 | B2 * | 10/2019 | Liu | G06T 7/80 |
| 11,172,193 | B1 * | 11/2021 | Reddy | H04N 23/633 |
| 12,307,715 | B2 * | 5/2025 | Chen | G06T 7/73 |
| 2009/0180008 | A1 * | 7/2009 | Williams | G06T 7/80 |
| | | | | 348/241 |
| 2011/0025853 | A1 * | 2/2011 | Richardson | H04N 23/66 |
| | | | | 348/E7.085 |
| 2014/0104169 | A1 | 4/2014 | Masselli et al. | |
| 2017/0372491 | A1 * | 12/2017 | Doganis | H04N 5/44504 |
| 2017/0372492 | A1 * | 12/2017 | Doganis | G06T 7/80 |
| 2019/0364206 | A1 | 11/2019 | Dal Mutto et al. | |
| 2021/0243369 | A1 * | 8/2021 | Dal Mutto | G06T 7/80 |

FOREIGN PATENT DOCUMENTS

| | | | | | |
|---|---|---|---|---|---|
| CN | 108818536 | A * | 11/2018 | | B25J 9/1692 |
| CN | 109671123 | A | 4/2019 | | |
| CN | 109990698 | A | 7/2019 | | |
| CN | 110555887 | A | 12/2019 | | |
| CN | 111402344 | A | 7/2020 | | |
| CN | 112396663 | A | 2/2021 | | |
| CN | 113409403 | A | 9/2021 | | |
| CN | 113506349 | A | 10/2021 | | |
| CN | 110809786 | B * | 10/2023 | | G06T 7/80 |
| EP | 1434169 | A2 * | 6/2004 | | G06T 7/80 |
| KR | 101818104 | B1 * | 1/2018 | | G06T 7/80 |
| WO | WO-2018173551 | A1 * | 9/2018 | | H04N 17/002 |

OTHER PUBLICATIONS

The partial supplementary European search report received in the corresponding European application 21966074.3, mailed on May 2, 2024.

The Notice of Reasons for Refusal received in the counterpart Japanese application 2023-555177, mailed on Dec. 16, 2024.

The First Office Action received in the counterpart CN application 202180096855.7, mailed on Aug. 8, 2025, 14 pages with English translation.

The international search report received in the corresponding international application PCT/CN2021/135305, mailed Jul. 29, 2022.

* cited by examiner

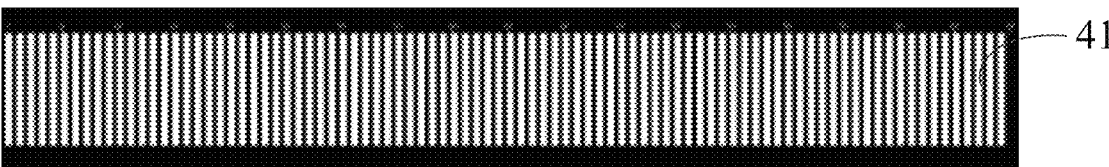

Fig. 3

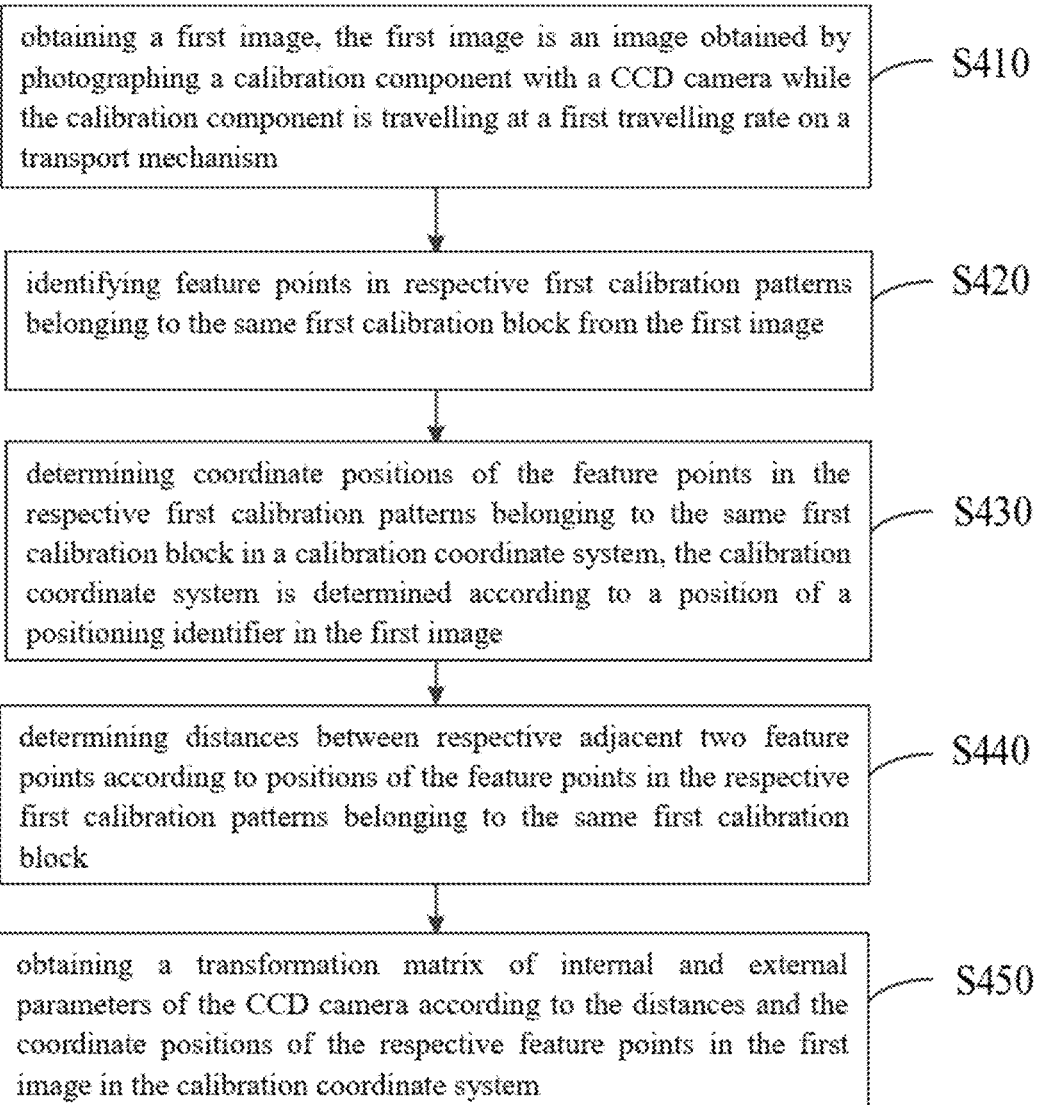

| | |
|---|---|
| obtaining a first image, the first image is an image obtained by photographing a calibration component with a CCD camera while the calibration component is travelling at a first travelling rate on a transport mechanism | S410 |
| identifying feature points in respective first calibration patterns belonging to the same first calibration block from the first image | S420 |
| determining coordinate positions of the feature points in the respective first calibration patterns belonging to the same first calibration block in a calibration coordinate system, the calibration coordinate system is determined according to a position of a positioning identifier in the first image | S430 |
| determining distances between respective adjacent two feature points according to positions of the feature points in the respective first calibration patterns belonging to the same first calibration block | S440 |
| obtaining a transformation matrix of internal and external parameters of the CCD camera according to the distances and the coordinate positions of the respective feature points in the first image in the calibration coordinate system | S450 |

Fig. 4

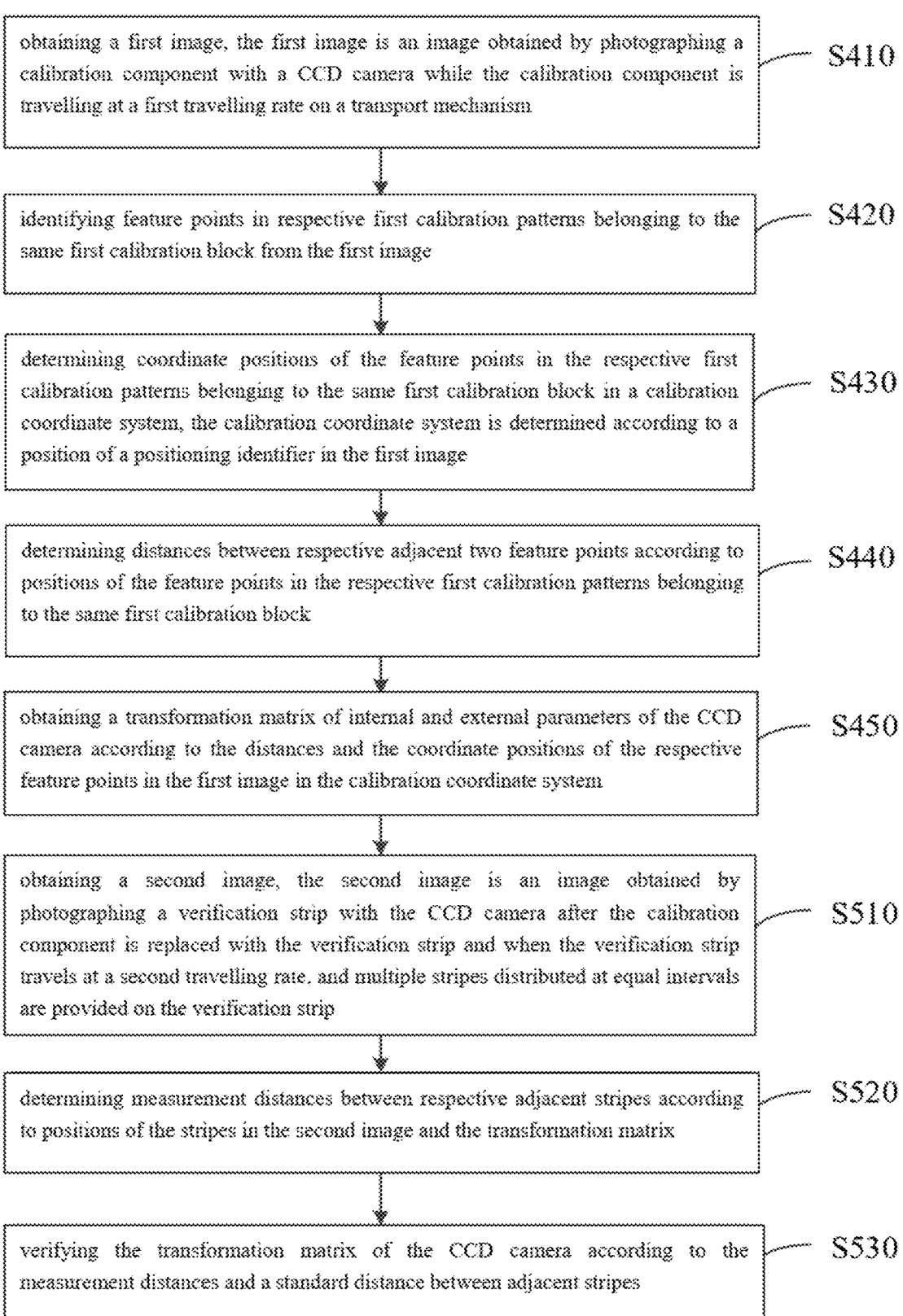

obtaining a first image, the first image is an image obtained by photographing a calibration component with a CCD camera while the calibration component is travelling at a first travelling rate on a transport mechanism — S410 identifying feature points in respective first calibration patterns belonging to the same first calibration block from the first image — S420 determining coordinate positions of the feature points in the respective first calibration patterns belonging to the same first calibration block in a calibration coordinate system, the calibration coordinate system is determined according to a position of a positioning identifier in the first image — S430 determining distances between respective adjacent two feature points according to positions of the feature points in the respective first calibration patterns belonging to the same first calibration block — S440 obtaining a transformation matrix of internal and external parameters of the CCD camera according to the distances and the coordinate positions of the respective feature points in the first image in the calibration coordinate system — S450 obtaining a second image, the second image is an image obtained by photographing a verification strip with the CCD camera after the calibration component is replaced with the verification strip and when the verification strip travels at a second travelling rate, and multiple stripes distributed at equal intervals are provided on the verification strip — S510 determining measurement distances between respective adjacent stripes according to positions of the stripes in the second image and the transformation matrix — S520 verifying the transformation matrix of the CCD camera according to the measurement distances and a standard distance between adjacent stripes — S530

Fig. 5

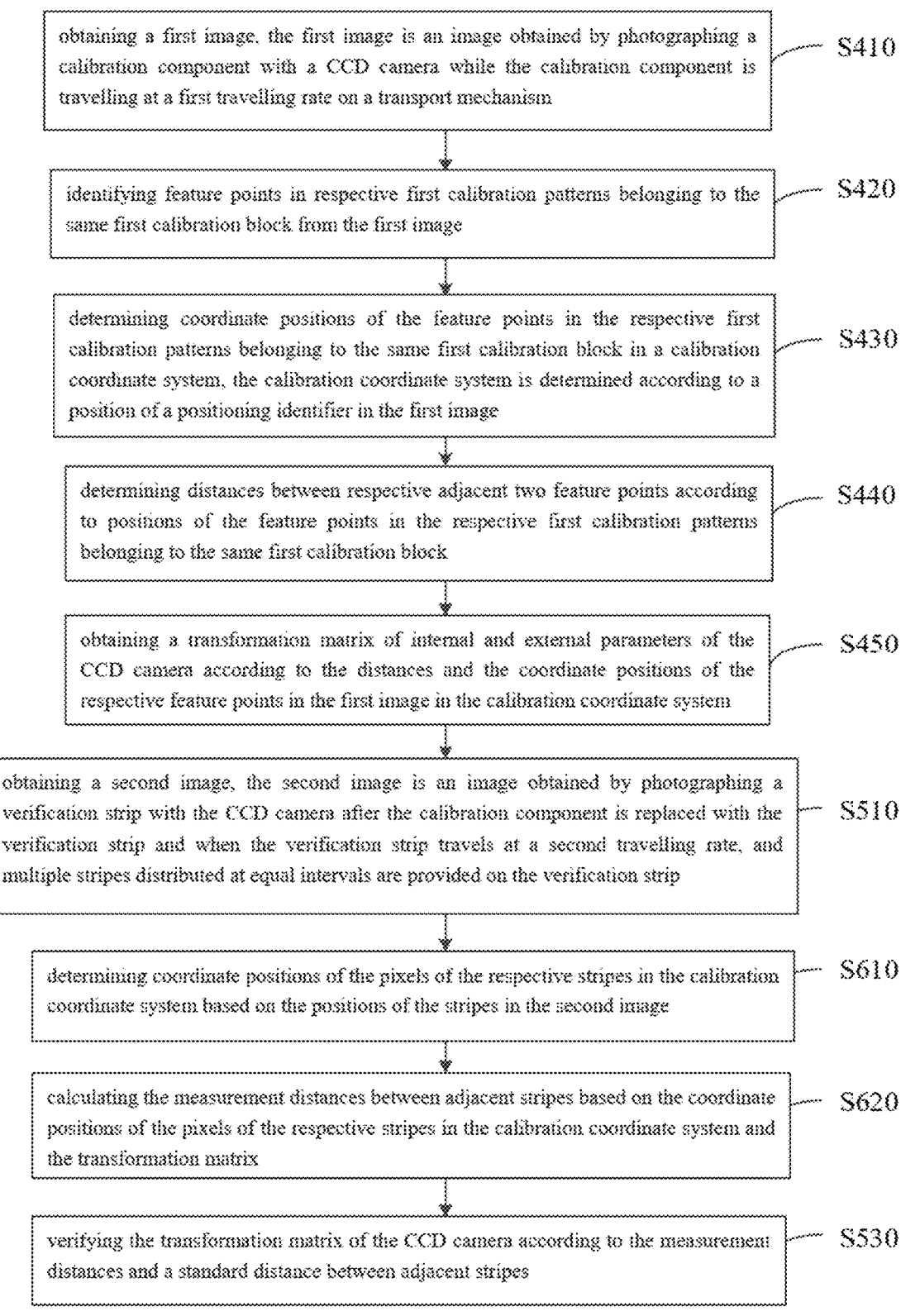

obtaining a first image, the first image is an image obtained by photographing a calibration component with a CCD camera while the calibration component is travelling at a first travelling rate on a transport mechanism — S410 identifying feature points in respective first calibration patterns belonging to the same first calibration block from the first image — S420 determining coordinate positions of the feature points in the respective first calibration patterns belonging to the same first calibration block in a calibration coordinate system, the calibration coordinate system is determined according to a position of a positioning identifier in the first image — S430 determining distances between respective adjacent two feature points according to positions of the feature points in the respective first calibration patterns belonging to the same first calibration block — S440 obtaining a transformation matrix of internal and external parameters of the CCD camera according to the distances and the coordinate positions of the respective feature points in the first image in the calibration coordinate system — S450 obtaining a second image, the second image is an image obtained by photographing a verification strip with the CCD camera after the calibration component is replaced with the verification strip and when the verification strip travels at a second travelling rate, and multiple stripes distributed at equal intervals are provided on the verification strip — S510 determining coordinate positions of the pixels of the respective stripes in the calibration coordinate system based on the positions of the stripes in the second image — S610 calculating the measurement distances between adjacent stripes based on the coordinate positions of the pixels of the respective stripes in the calibration coordinate system and the transformation matrix — S620 verifying the transformation matrix of the CCD camera according to the measurement distances and a standard distance between adjacent stripes — S530

Fig. 6

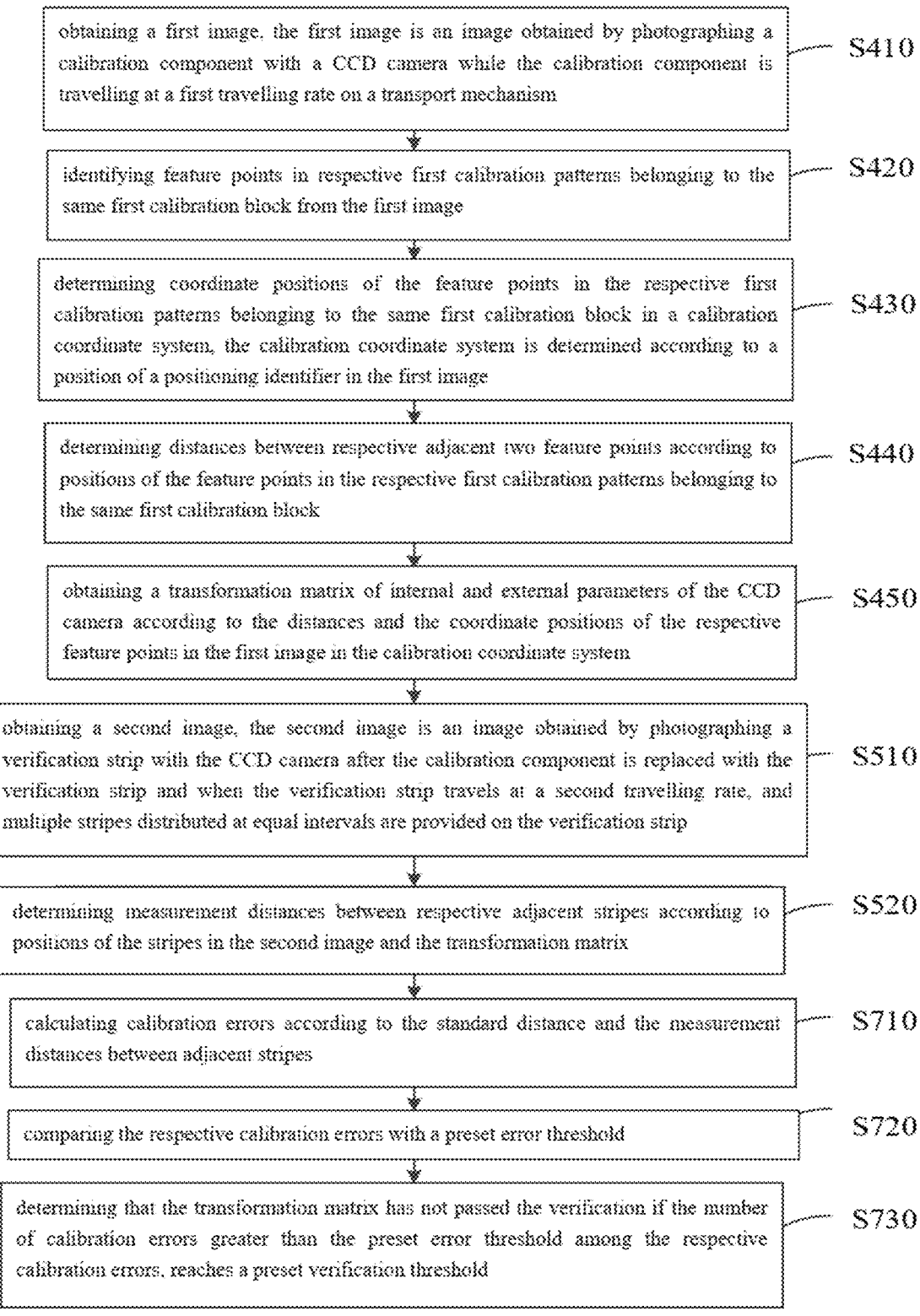

obtaining a first image, the first image is an image obtained by photographing a calibration component with a CCD camera while the calibration component is travelling at a first travelling rate on a transport mechanism — S410 identifying feature points in respective first calibration patterns belonging to the same first calibration block from the first image — S420 determining coordinate positions of the feature points in the respective first calibration patterns belonging to the same first calibration block in a calibration coordinate system, the calibration coordinate system is determined according to a position of a positioning identifier in the first image — S430 determining distances between respective adjacent two feature points according to positions of the feature points in the respective first calibration patterns belonging to the same first calibration block — S440 obtaining a transformation matrix of internal and external parameters of the CCD camera according to the distances and the coordinate positions of the respective feature points in the first image in the calibration coordinate system — S450 obtaining a second image, the second image is an image obtained by photographing a verification strip with the CCD camera after the calibration component is replaced with the verification strip and when the verification strip travels at a second travelling rate, and multiple stripes distributed at equal intervals are provided on the verification strip — S510 determining measurement distances between respective adjacent stripes according to positions of the stripes in the second image and the transformation matrix — S520 calculating calibration errors according to the standard distance and the measurement distances between adjacent stripes — S710 comparing the respective calibration errors with a preset error threshold — S720 determining that the transformation matrix has not passed the verification if the number of calibration errors greater than the preset error threshold among the respective calibration errors, reaches a preset verification threshold — S730

Fig. 7

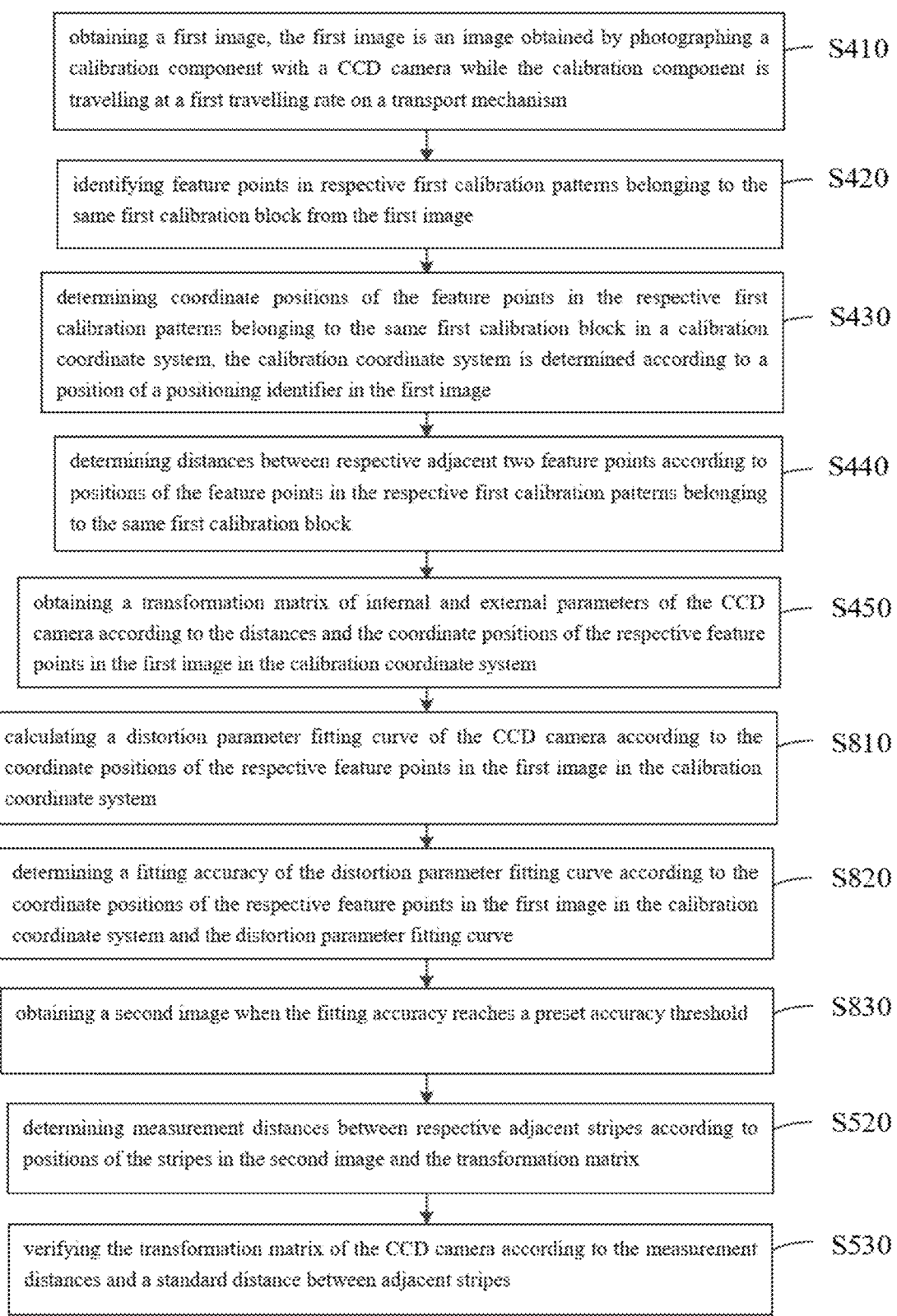

obtaining a first image, the first image is an image obtained by photographing a calibration component with a CCD camera while the calibration component is travelling at a first travelling rate on a transport mechanism — S410 identifying feature points in respective first calibration patterns belonging to the same first calibration block from the first image — S420 determining coordinate positions of the feature points in the respective first calibration patterns belonging to the same first calibration block in a calibration coordinate system, the calibration coordinate system is determined according to a position of a positioning identifier in the first image — S430 determining distances between respective adjacent two feature points according to positions of the feature points in the respective first calibration patterns belonging to the same first calibration block — S440 obtaining a transformation matrix of internal and external parameters of the CCD camera according to the distances and the coordinate positions of the respective feature points in the first image in the calibration coordinate system — S450 calculating a distortion parameter fitting curve of the CCD camera according to the coordinate positions of the respective feature points in the first image in the calibration coordinate system — S810 determining a fitting accuracy of the distortion parameter fitting curve according to the coordinate positions of the respective feature points in the first image in the calibration coordinate system and the distortion parameter fitting curve — S820 obtaining a second image when the fitting accuracy reaches a preset accuracy threshold — S830 determining measurement distances between respective adjacent stripes according to positions of the stripes in the second image and the transformation matrix — S520 verifying the transformation matrix of the CCD camera according to the measurement distances and a standard distance between adjacent stripes — S530

Fig. 8

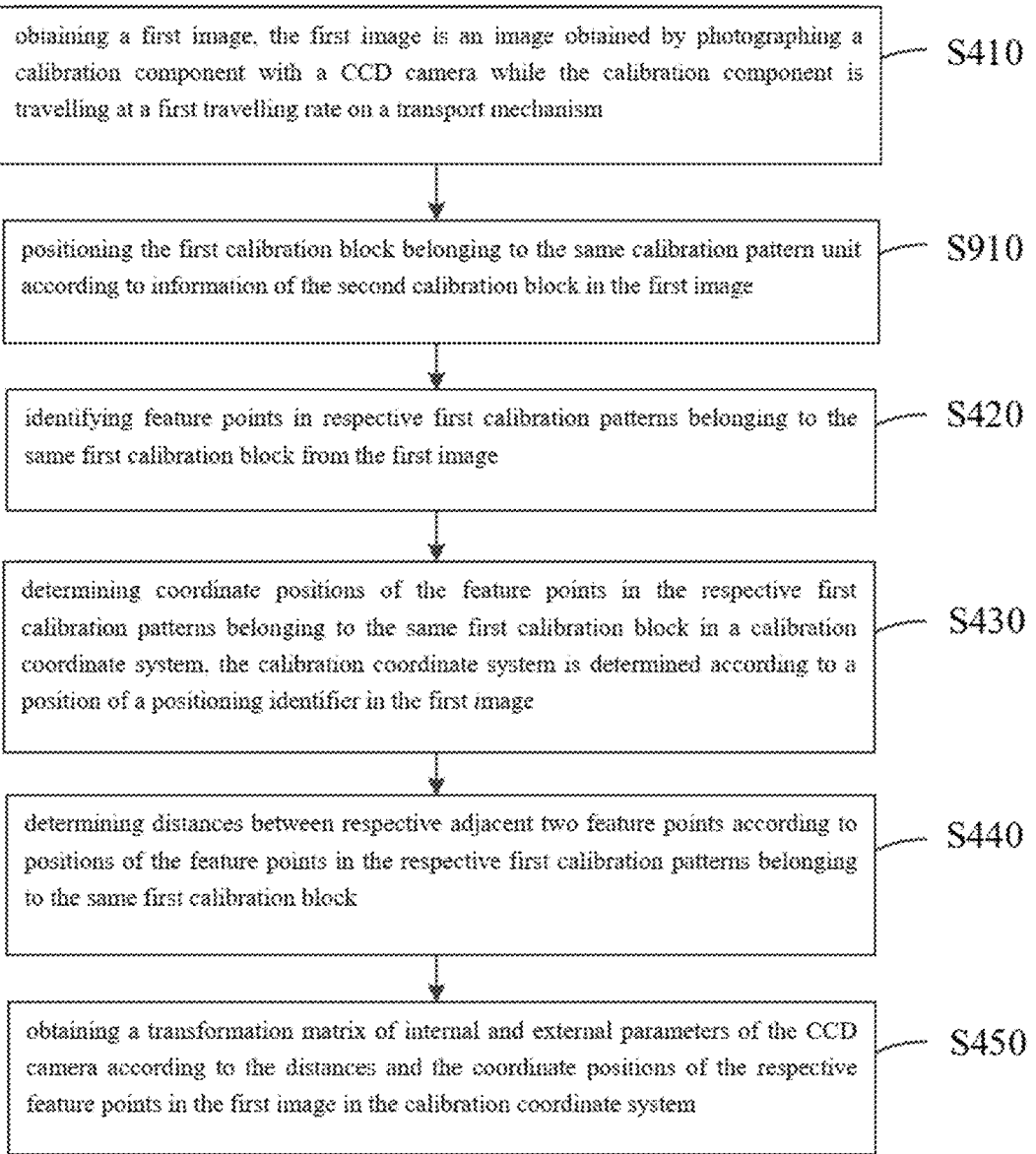

obtaining a first image, the first image is an image obtained by photographing a calibration component with a CCD camera while the calibration component is travelling at a first travelling rate on a transport mechanism — S410 positioning the first calibration block belonging to the same calibration pattern unit according to information of the second calibration block in the first image — S910 identifying feature points in respective first calibration patterns belonging to the same first calibration block from the first image — S420 determining coordinate positions of the feature points in the respective first calibration patterns belonging to the same first calibration block in a calibration coordinate system, the calibration coordinate system is determined according to a position of a positioning identifier in the first image — S430 determining distances between respective adjacent two feature points according to positions of the feature points in the respective first calibration patterns belonging to the same first calibration block — S440 obtaining a transformation matrix of internal and external parameters of the CCD camera according to the distances and the coordinate positions of the respective feature points in the first image in the calibration coordinate system — S450

Fig. 9

CCD CAMERA CALIBRATION SYSTEM, METHOD, COMPUTING DEVICE AND STORAGE MEDIUM

CROSS REFERENCE TO RELATED MATTER

This application is a continuation of international application PCT/CN2021/135305, filed Dec. 3, 2021 and entitled "CCD CAMERA CALIBRATION SYSTEM, METHOD, COMPUTING DEVICE AND STORAGE MEDIUM", the entire content of which is hereby incorporated by reference in its entirety.

FIELD

The present application relates to a technical field of device calibration, and particularly relates to a CCD camera calibration system, method, device, computing device, and storage medium.

BACKGROUND

Currently, with the continuous development and construction of production lines, the number of transport mechanisms on the production lines is also increasing. In order to ensure the yield rate of mass-produced products, it is necessary to conduct CCD detection on the products on the transport mechanism by CCD (Charge Coupled Device) cameras. In order to ensure the effectiveness of detection data, it is necessary to calibrate the CCD cameras.

During the CCD detection on the existing transport mechanism, the CCD camera calibration method generally attaches a detection label to the product, photographs the detection label and the product when the product and the detection label move together by a CCD camera, and obtains a transformation matrix of the CCD camera.

However, due to the size error of the product, measurement errors easily occur in the transformation matrix of the CCD camera obtained according to the product and detection label.

SUMMARY

The embodiments of the present application provides a CCD camera calibration system, method, device, computing device, and storage medium, which can solve the technical problem of the measurement errors in existing CCD camera calibration methods.

On one aspect, the embodiments of the present application provide a CCD camera calibration system, which includes:

a transport mechanism;

a calibration component, wherein the calibration component is disposed on the transport mechanism, a plurality of calibration pattern units are arranged in a length direction on the calibration component, each calibration pattern unit includes a first calibration block, and the first calibration block includes a positioning identifier and multiple first calibration patterns that are arranged uniformly;

a CCD camera for photographing the calibration component to obtain a first image while the calibration component is travelling; and a processing module, wherein the processing module is in communication connection with the CCD camera, and is adapted to calculate a transformation matrix of internal and external parameters of the CCD camera according to the first image.

By making the calibration component to travel on the transport mechanism and photographing the calibration patterns on the calibration component, the CCD camera calibration can be achieved, and the calibration can be performed without use of actual products, thereby avoiding the calibration results from being affected by the product size errors and improving the accuracy of the calibration results. Meanwhile, the calibration results include an included angle of the movement direction of the calibration component, which can eliminate the influence of non-coincidence among different coordinate systems in static calibration methods.

In some embodiments, the CCD camera calibration system further includes:

a verification strip adapted for replacing the calibration component after the transformation matrix of the internal and external parameters of the CCD camera is obtained, wherein multiple stripes distributed at equal intervals are provided on the verification strip.

By providing the verification strip to verify the calibration results after obtaining the calibration results, the accuracy of the CCD camera calibration can be improved.

In some embodiments, the verification strip is a film with a white substrate, and the stripes are black stripes.

By setting the colors of the substrate and the stripes of the verification strip, the stripes can be clearly identified from the image, thereby improving the accuracy of the verification process.

In some embodiments, the calibration component includes a calibration strip, the calibration strip includes a white substrate, and the color of the first calibration patterns is black.

By setting the color of the substrate of the calibration component and the color of the first calibration patterns, the first calibration patterns can be accurately identified, thereby improving the identification accuracy of the first calibration patterns.

In some embodiments, the first calibration patterns are formed into circles.

By providing circular patterns that are uniformly arranged on the calibration component, the accuracy and reliability of calibration and subsequent measurements can be improved.

In some embodiments, the calibration pattern unit further includes a second calibration block, which is disposed on one side of the first calibration block in a width direction of the calibration component.

The second calibration block can be identified from the image at first, so as to achieve a quick and rough positioning, and after the second calibration block being identified, adjacent first calibration block can be identified, thus achieving the calibration process.

In some embodiments, the calibration pattern unit includes multiple first calibration blocks arranged in a width direction of the calibration component; and the calibration component is adapted for being separated into multiple sub calibration components after being split in the transport mechanism, and each sub calibration component includes at least one first calibration block.

By providing multiple first calibration blocks in the width direction of the calibration component, after the calibration component is split by the transport mechanism, the CCD camera disposed downstream of the splitting position can capture an image of at least one complete first calibration block, and thus the calibration of the CCD camera downstream of the splitting position can be achieved.

On a second aspect, the embodiments of the present application provide a CCD camera calibration method, including steps of:

obtaining a first image, wherein the first image is an image obtained by photographing a calibration component with a CCD camera when the calibration component is travelling at a first travelling rate on a transport mechanism;

identifying feature points in respective first calibration patterns belonging to the same first calibration block from the first image;

determining coordinate positions of the feature points in the respective first calibration patterns belonging to the same first calibration block in a calibration coordinate system, wherein the calibration coordinate system is determined according to a position of a positioning identifier in the first image;

determining distances between respective adjacent two feature points according to positions of the feature points in the respective first calibration patterns belonging to the same first calibration block; and obtaining a transformation matrix of internal and external parameters of the CCD camera according the distances and the coordinate positions of the respective feature points in the first image in the calibration coordinate system.

By making the calibration component to travel on the transport mechanism to achieve the calibration of the CCD camera, the calibration can be performed without use of actual products, thereby avoiding the calibration results from being affected by the product size errors and improving the accuracy of the calibration results.

In some embodiments, after obtaining the transformation matrix of the internal and external parameters of the CCD camera according to the distances and the coordinate positions of the respective feature points in the first image in the calibration coordinate system, the method further includes steps of:

obtaining a second image, wherein the second image is an image obtained by photographing a verification strip with the CCD camera after the calibration component is replaced with the verification strip and when the verification strip travels at a second travelling rate, and wherein multiple stripes distributed at equal intervals are provided on the verification strip;

determining measurement distances between respective adjacent stripes according to positions of the stripes in the second image and the transformation matrix; and verifying the transformation matrix of the CCD camera according to the measurement distances and a standard distance between adjacent stripes.

By providing the verification strip to verify the calibration results after obtaining the calibration results, the accuracy of the CCD camera calibration can be improved.

In some embodiments, before obtaining the second image, the method further includes steps of:

calculating a distortion parameter fitting curve of the CCD camera according to the coordinate positions of the respective feature points in the first image in the calibration coordinate system; and determining a fitting accuracy of the distortion parameter fitting curve according to the coordinate positions of the respective feature points in the first image in the calibration coordinate system and the distortion parameter fitting curve, the step of obtaining the second image includes a step of:

obtaining the second image when the fitting accuracy reaches a preset accuracy threshold.

Before verifying the transformation matrix, the distortion parameter fitting curve can be further generated according to the distortion parameters of various positions of the CCD camera, and whether the fitting accuracy meets the requirements can be judged. If the fitting accuracy does not meet the requirements, the verification process will not be carried out, thereby reducing the times of verification.

In some embodiments, the step of determining the measurement distances between respective adjacent stripes according to the positions of the stripes in the second image and the transformation matrix includes steps of:

determining coordinate positions of pixels of the respective stripes in the calibration coordinate system according to the positions of the stripes in the second image; and calculating the measurement distances between respective adjacent stripes according to the coordinate positions of the pixels of the respective stripes in the calibration coordinate system and the transformation matrix.

According to the coordinate positions corresponding to the pixels of respective stripes and the transformation matrix obtained by calibration, the measurement distances between respective adjacent stripes in the captured second image can be calculated. By comparing the measurement distances with the actual standard distance, the accuracy of the calibration results can be determined.

In some embodiments, the step of verifying the transformation matrix of the CCD camera according to the measurement distances and the standard distance between adjacent stripes includes steps of:

calculating calibration errors according to the standard distance and respective measurement distances between adjacent stripes;

comparing respective calibration errors with a preset error threshold; and determining that the transformation matrix has not passed the verification, when the number of calibration errors greater than the preset error threshold among the respective calibration errors reaches a preset verification threshold.

When verifying the calibration results through the verification strip, an allowable range of the calibration errors is provided, and it can be determined that the transformation matrix can pass the verification if the calibration errors fall within this range; thus, the effectiveness of the calibration results can be ensured while excessive times of calibration can be avoided.

In some embodiments, the calibration pattern unit further includes a second calibration block, which is disposed on one side of the first calibration block in a width direction of the calibration component; and before identifying the feature points in the respective first calibration patterns belonging to the same first calibration block from the first image, the method further includes a step of:

positioning the first calibration block belonging to the same calibration pattern unit according to information of the second calibration block in the first image.

By providing the second calibration block, the second calibration block can be identified from the image at first, so as to achieve a quick and rough positioning, and after the second calibration block being identified, adjacent first calibration block can be identified, thus achieving the calibration process according to the first calibration block.

In some embodiments, the second calibration block is rectangular.

By forming the second calibration block into a rectangular pattern, the identification can be facilitated.

In some embodiments, the first calibration patterns are formed into circles, and the feature points are at the centers of the circles.

By forming the first calibration patterns into circles, centers of the circles can be quickly and accurately determined to serve as the feature points. Compared to other shapes and fitted feature points, the accuracy and stability of the feature points can be improved.

On a third aspect, the embodiments of the present application provide a CCD calibration device, which includes:

a photographing module for obtaining a first image, wherein the first image is an image obtained by photographing a calibration component with a CCD camera when the calibration component is travelling at a first travelling rate on a transport mechanism;

an identifying module for identifying feature points in respective first calibration patterns belonging to the same first calibration block from the first image;

a positioning module for determining coordinate positions of the feature points in the respective first calibration patterns belonging to the same first calibration block in a calibration coordinate system, wherein the calibration coordinate system is determined according to a position of a positioning identifier in the first image;

a calculating module for determining distances between respective adjacent two feature points according to positions of the feature points in the respective first calibration patterns belonging to the same first calibration block; and a calibration module for obtaining a transformation matrix of internal and external parameters of the CCD camera according to the distances and the coordinate positions of respective feature points in the first image in the calibration coordinate system.

On a fourth aspect, the embodiments of the present application provide a computing device, and the device includes a processor and a memory for storing computer program instructions;

the processor implements the CCD camera calibration method as described above when executing the computer program instructions.

On a fourth aspect, the embodiments of the present application provide a computer storage medium, the computer storage medium is stored with computer program instructions, and the CCD camera calibration method as described above is implemented when the computer program instructions are executed by the processor.

Compared with the prior art, in the CCD camera calibration system provided in the embodiments of the present application, the calibration component is provided at a position where a coil material is placed on the transport mechanism, so that the calibration component can travel on the conveyor belt of the transport mechanism and the calibration component is controlled to move on the transport mechanism; by photographing the calibration pattern units on the calibration component with the CCD camera, the first image of the first calibration patterns each containing a positioning identifier and multiple first calibration patterns that are uniformly arranged can be obtained, and the transformation matrix of the internal and external parameters of the CCD camera can be calculated according to the first image. By photographing the first calibration patterns uniformly arranged on the calibration component, the transformation matrix of the internal and external parameters of the CCD camera can be obtained according to the first image and the first calibration patterns; when calibrating the CCD camera, there is no need to provide actual products on the transport mechanism for operation, and thus the calibration results can be avoided from being affected by product size errors, thereby improving the accuracy of the calibration results.

BRIEF DESCRIPTION OF THE DRAWINGS

In order to describe technical solutions of the embodiments of the present application more clearly, a brief introduction will be given below to the accompanying drawings required in the embodiments of the present application. It is obvious that the accompanying drawings described below are only some embodiments of the present application, and for the person skilled in the art, other accompanying drawings can be obtained based on these accompanying drawings without any creative effort.

FIG. 3 is a structural schematic diagram of a verification strip in the embodiment of FIG. 1.

FIG. 4 is a flowchart of a CCD camera calibration method provided in an embodiment of the present application.

FIG. 5 is a flowchart of a CCD camera calibration method provided in another embodiment of the present application.

FIG. 6 is a flowchart of a CCD camera calibration method provided in a further embodiment of the present application.

FIG. 7 is a flowchart of a CCD camera calibration method provided in another further embodiment of the present application.

FIG. 8 is a flowchart of a CCD camera calibration method provided in a further embodiment of the present application.

FIG. 9 is a flowchart of a CCD camera calibration method provided in another further embodiment of the present application.

Figure 1:
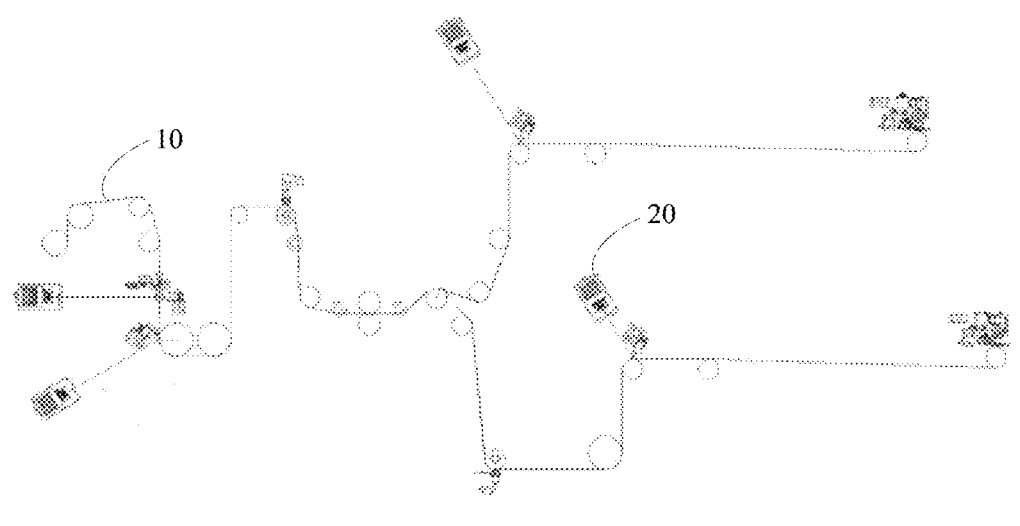
FIG. 1 is a structural schematic diagram of a CCD camera calibration system provided in an embodiment of the present application.

In the accompanying drawings, they are not drawn to the actual scale.

DETAILED DESCRIPTION

The features and exemplary embodiments of various aspects of the present application will be described in detail below. In order to make purposes, technical solutions, and advantages of the present application clearer, the present application will be described further in detail in combination with the accompanying drawings and specific embodiments. It should be understood that the specific embodiments described here are only intended to explain the present application while not to limit it. For the person skilled in the art, the present application can be implemented without the need for some of these specific details. The description of the embodiments below is only intended to provide a better understanding of the present application by showing examples of the present application.

It should be noted that in the text, relational terms such as "first" and "second" are only used to distinguish one entity or operation from another entity or operation, and do not necessarily require or imply any actual relationship or order between these entities or operations. Moreover, the terms "comprising", "including", or any other variations thereof are intended to encompass non-exclusive inclusion, such that a process, method, item, or device that includes a series of elements not only includes these elements, but also includes other elements that are not explicitly listed, or also includes elements inherent in such process, method, item, or device. Without further limitations, the elements limited by the statement "including . . . " do not exclude the existence of other identical elements in the process, method, item, or device that includes said elements.

It should be noted that in the absence of conflicts, embodiments and features in the embodiments in the present application can be combined with each other. Below, the embodiments of the present application will be described in detail in combination with the accompanying drawings.

Currently, with the continuous development and construction of production lines, the number of fixed point transport mechanisms on the production lines is also increasing. In order to ensure the yield rate of mass-produced products, it is necessary to conduct CCD detection on the products by CCD cameras. In order to ensure the effectiveness of detection data, it is necessary to calibrate the CCD cameras.

The existing CCD camera calibration method generally attaches a detection label to the product, photographing the detection label and the product when the product and the detection label move together by a CCD camera, and obtains a transformation matrix of the CCD camera. However, due to the size error of the product, measurement errors easily occur in the transformation matrix of the CCD camera obtained according to the product and detection label, resulting in significant errors in the calibration results.

In order to solve the above technical problem, the embodiments of the present application provide a CCD camera calibration system, method, device, computing device, and storage medium. Below, the CCD camera calibration system provided in the embodiments of the present application will be described at first.

FIG. 1 shows a structural schematic diagram of a transport mechanism and a CCD camera in a CCD camera calibration system provided in one embodiment of the present application. The CCD camera calibration system includes a transport mechanism, a calibration component, a CCD camera 20, and a processing module (not shown).

Figure 2:
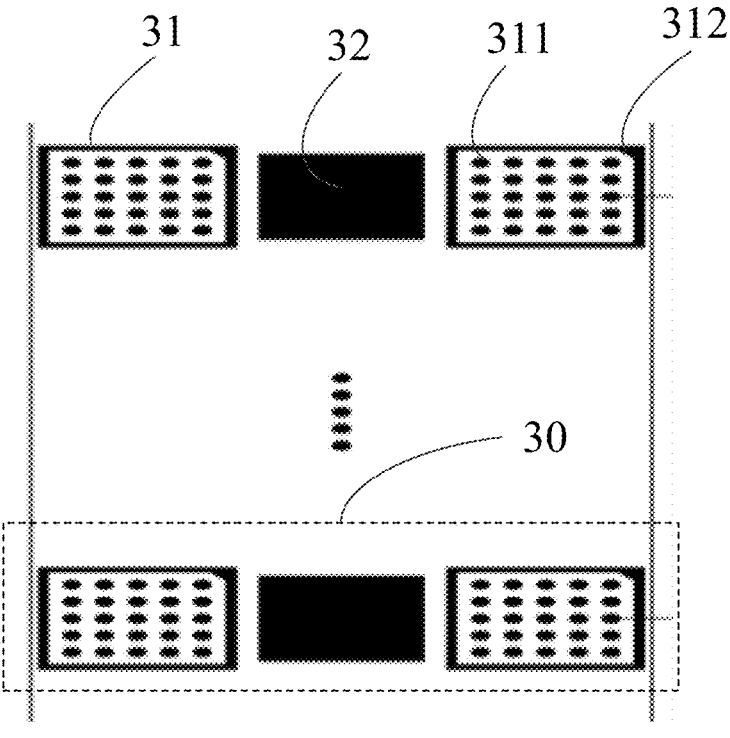
FIG. 2 is a structural schematic diagram of a calibration component in the embodiment of FIG. 1.

Referring to FIG. 2, the calibration component can be disposed on the transport mechanism. The calibration component is provided with a plurality of calibration pattern units 30 arranged in a length direction of the calibration component, each calibration pattern unit 30 includes a first calibration block 31, which includes a positioning identifier and multiple first calibration patterns 311 that are uniformly arranged.

The transport mechanism can be a device adapted for transporting products. For example, the transport mechanism can be a die-cutting machine or other transport equipment, and the transport mechanism is provided with a conveyor belt 10. When the transport mechanism operates, the calibration component can travel on the conveyor belt 10 of the transport mechanism, and the CCD camera 20 can photograph the calibration component while it is travelling on the conveyor belt 10 to obtain a corresponding first image.

The processing module is in communication connection with the CCD camera 20, the processing module can obtain the first image after the CCD camera 20 captures it, and calculate a transformation matrix of internal and external parameters of the CCD camera 20 according to the first image, and thus achieve the calibration of the CCD camera 20.

After obtaining the first image, the processing module can identify the calibration pattern unit 30 from the first image, and can determine the corresponding positioning identifier 312 and multiple first calibration patterns 311 that are uniformly arranged according to the first calibration block 31 in the calibration pattern unit 30. The processing module can determine a corresponding calibration coordinate system according to the positioning identifier 312, and make a calculation according to coordinate positions of the multiple first calibration patterns 311 in the calibration coordinate system and pixels respectively corresponding to the multiple first calibration patterns 311, so as to obtain the transformation matrix of the internal and external parameters of the CCD camera 20.

In the present embodiment, by disposing the calibration component on the transport mechanism so that the calibration component can travel on the conveyor belt 10 of the transport mechanism, the CCD camera 20 can be disposed at a fixed position next to the transport mechanism and photograph a fixed region of the transport mechanism, and when the calibration component travels to a photographing area of the CCD camera 20, the CCD camera 20 can photograph the calibration component, so as to obtain the first image containing the calibration pattern unit 30. The first image includes the first calibration block 31, which includes the positioning identifier 312 and multiple first calibration patterns 311, the positioning identifier 312 can represent a travelling direction of the calibration component and the calibration coordinate system of the first calibration block 31, and the multiple first calibration patterns 311 are uniformly arranged according to a preset arrangement manner. The processing module can determine the calibration coordinate system according to the positioning identifier 312, can determine a corresponding relationship between the first image and the calibration coordinate system according to the corresponding pixels of the multiple first calibration patterns 311 in the first image and the originally corresponding coordinate positions of the multiple first calibration patterns 311, and thus can calculate the transformation matrix of the internal and external parameters of CCD camera 20. By photographing the first calibration patterns 311 that are uniformly arranged on the calibration component, the transformation matrix of the internal and external parameters of CCD camera 20 can be obtained according to the first image and preset coordinate positions of the first calibration patterns 311, and the calibration of CCD camera 20 can be achieved without the need of providing an actual product on the transport mechanism, thereby avoiding the influence of the product size errors on the calibration results and improving the accuracy of the calibration results.

As shown in FIG. 1, it can be understood that multiple CCD cameras 20 can be disposed respectively at multiple different positions next to the transport mechanism to photograph and detect different transport regions of the transport mechanism. By photographing the calibration component travelling on the transport mechanism with multiple CCD cameras 20, the calibration results of the CCD cameras 20 can include included angles of movement directions of the calibration component. Compared to a static calibration method, the influence of non-coincidence among different coordinate systems under the static calibration, can be eliminated.

As an example, the calibration component can be formed as a strip, that is, the calibration component can include a calibration strip. For example, when the product transported by the transport mechanism is a coil material, the calibration strip can be provided according to the coil material. Specifically, the calibration strip can be provided with an inner diameter consistent with an inner diameter of the coil material of the actual product on the transport mechanism, and with a length greater than a conveyor belt length of the transport mechanism, so that the calibration strip can be placed at a position where the coil material is placed on the transport mechanism and runs on the transport mechanism to cover the entire conveyor belt of the transport mechanism. Moreover, since the calibration strip is provided with multiple calibration pattern units 30 arranged in the length direction of the calibration strip, when the calibration strip runs until covering the conveyor belt of the transport mechanism, all the CCD cameras 20 at respective different positions can capture the first image containing at least one complete calibration pattern unit 30 at their photographing area, and can achieve calibration of the CCD camera 20, and when multiple cameras are provided, simultaneous calibrations of the multiple cameras can be achieved.

It can be understood that the calibration component can further be directly attached to the conveyor belt 10 of the transport mechanism. When the conveyor belt 10 is running, the CCD camera 20 can photograph the calibration component attached to a surface of conveyor belt 10.

It should be noted that the CCD camera 20 is generally a line scanning camera. When a setting angel of the line scanning camera has a significant difference from a travelling direction of products on the transport mechanism, the processing module can further determine an angle between an installation position of the CCD camera 20 and the travelling direction of products on the transport mechanism according to the respective first calibration patterns 311 in the captured first image, so that the calibration of CCD camera 20 can still be achieved even when the installation angle of the CCD camera 20 has a significant difference from the travelling direction of the products on the transport mechanism.

Referring to FIG. 3, in some embodiments, the CCD camera calibration system mentioned above may further include a verification strip. The verification strip is provided with multiple stripes 41 distributed at equal intervals. After the calibration component being disposed on the transport mechanism for travelling and the transformation matrix of the internal and external parameters of the CCD camera 20 being calculated by capturing the first image, the verification strip can be used to replace the calibration component, when the verification strip is travelling on the transport mechanism, the CCD camera 20 can photograph the stripes 41 on the verification strip, and measurement distances of adjacent stripes 41 can be calculated by using the calculated transformation matrix of the internal and external parameters according to the captured image. Due to a standard distance of adjacent stripes 41 is preset during production of the verification strip, it can be determined whether the calculated transformation matrix of the internal and external parameters has passed the verification according to the measurement distances obtained by photographing and calculation and the original standard distance. After having passed the verification, the calibration process of the CCD camera 20 is completed. By providing the verification strip to travel on the transport mechanism and controlling the CCD camera 20 to photograph the stripes 41 on the verification strip, the measurement distances of adjacent stripes 41 can be calculated according to pixels between adjacent stripes 41 in the captured image and the transformation matrix of the internal and external parameters of the CCD camera 20 calculated through the calibration component, and by comparing the measurement distances with the standard distance between stripes, the accuracy of the calibration results of the CCD camera 20 can be determined, thereby verifying the calibration of CCD camera 20.

In some embodiments, the above-mentioned verification strip can be a film with a white substrate, and the stripes 41 on the verification strip can be black stripes 41. The CCD camera 20 can identify the white substrate and the black stripes 41 in the image after photographing the verification strip and capturing the image, thereby achieving the verification of the calibration process of CCD camera 20. It can be understood that the substrate or stripes 41 of the verification strip can be formed in other colors, as long as the substrate and stripes 41 can be clearly identified from the captured image. The above-mentioned verification strip can have a length greater than a roller length of the transport mechanism, and the verification strip needs to be attached to a surface of the conveyor belt of the transport mechanism 10.

In some embodiments, the above-mentioned calibration component may be formed as a calibration strip with a white substrate, and the color of the positioning identifier 312 and the first calibration patterns 311 in the first calibration block 31 of the calibration pattern unit 30 on the calibration component may be black. Similarly, by setting the substrate and patterns of the calibration component to be white and black respectively, the CCD camera 20 can clearly distinguish the substrate from the first calibration block 31 in the captured image, thereby achieving the calculation of the transformation matrix of the internal and external parameters of the CCD camera 20 according to the identified first calibration block 31.

In some embodiments, the first calibration patterns may be formed into circles, that is, the calibration pattern unit includes a positioning identifier and multiple circular patterns that are uniformly arranged. By providing circular patterns and photographing with the CCD camera 20, centers of the respective circular patterns can be accurately fitted from the captured image, and the CCD calibration can be performed according to the centers of the respective circular patterns. Compared to calibration and identification using other patterns, the accuracy and reliability of the calibration and measurement after the calibration can be improved.

Each calibration pattern unit 30 on the calibration component may have an area not less than 100 $mm^2$, and have a shape of square or rectangle. Among the multiple first calibration patterns 311 in the calibration pattern unit 30, distances between adjacent first calibration patterns 311 may be not less than 0.05 mm.

In some embodiments, each calibration pattern unit 30 in the aforementioned calibration component may further include a second calibration block 32, which may be disposed on one side of the first calibration block 31 in a width direction of the calibration component. That is, each calibration pattern unit 30 includes a first calibration block 31 and a second calibration block 32 arranged side by side in the width direction of the calibration component. The second calibration block 32 may be formed into a rectangular pattern. After capturing the first image containing the first calibration block 31 and the second calibration block 32, directions of the coordinate system can be quickly determined through the second calibration block 32 so as to achieve rough positioning of coordinates. After the rough positioning, a precise positioning of coordinates can be achieved through the positioning identifier 312 in the first calibration block 31, and the transformation matrix of internal and external parameters can be calculated according to pixel positions of the respective first calibration patterns 311 in the first calibration block 31.

In some embodiments, each calibration pattern unit 30 in the aforementioned calibration component may include multiple first calibration blocks 31, and the multiple first calibration blocks 31 may be arranged in the width direction of the calibration component.

As shown in FIG. 1, the transport mechanism may split the product during operation. By providing multiple first calibration blocks 31 in the width direction on the calibration component, after the transport mechanism splits the calibration component and thus the calibration component is split into multiple sub calibration components, each sub calibration component on each belt path of the transport mechanism contains at least one first calibration block 31. Thus, all the CCD cameras 20 disposed downstream of the splitting position of the transport mechanism can photograph the first calibration block 31 on the sub calibration component, so as to achieve calibration of the CCD cameras 20 downstream of the splitting position of the transport mechanism.

It can be understood that in the case that the transport mechanism separates the calibration component into two sub calibration components, two first calibration blocks 31 can be provided in the width direction of the calibration component, the two first calibration blocks 31 may be symmetrical relative to an axis of the calibration component, and a distance between the two first calibration blocks 31 may be not less than 20 mm.

In some embodiments, as shown in FIG. 2, each calibration pattern unit 30 may include two first calibration blocks 31 and one second calibration block 32, which may be arranged in the width direction of the calibration component, and the second calibration block 32 may be disposed between the two first calibration blocks 31. When the calibration component passes through the splitting position of the transport mechanism, if the transport mechanism separates the calibration component into two sub calibration components, the second calibration block 32 can be separated into two parts, respectively located on the two sub calibration components. That is, the two sub calibration components can each include a complete first calibration block 31 and a part of the second calibration block 32. After the CCD camera 20 disposed downstream of the splitting position of the transport mechanism photographs the first calibration block 31 on the sub calibration component and obtains the first image, the processing module can further identify the part of the second calibration block 32 in the first image so as to achieve a quick positioning of coordinates.

Similarly, the stripes 41 in the above-mentioned verification strip may be formed as stripes 41 arranged in the width direction of the verification strip, and when the verification strip travels on the transport mechanism and is separated into multiple sub verification strips after passing through the splitting position of the transport mechanism, the CCD cameras 20 disposed downstream of the splitting position of the transport mechanism also can photograph the stripes 41 on the sub verification strips, so as to achieve the verification process of the calibration of the CCD cameras 20.

FIG. 4 shows a flowchart of a CCD camera calibration method provided in one embodiment of the present application. The CCD camera calibration method is applied to a CCD calibration device, and includes steps of:

S410, obtaining a first image, wherein the first image is an image obtained by photographing a calibration component with a CCD camera while the calibration component is travelling at a first travelling rate on a transport mechanism;

S420, identifying feature points in respective first calibration patterns belonging to the same first calibration block from the first image;

S430, determining coordinate positions of the feature points in the respective first calibration patterns belonging to the same first calibration block in a calibration coordinate system, wherein the calibration coordinate system is determined according to a position of a positioning identifier in the first image;

S440, determining distances between respective adjacent two feature points according to positions of the feature points in the respective first calibration patterns belonging to the same first calibration block; and S450, obtaining a transformation matrix of internal and external parameters of the CCD camera according the distances and the coordinate positions of the respective feature points in the first image in the calibration coordinate system.

In the present embodiment, the CCD calibration device can control the CCD camera to photograph the calibration component to obtain the first image, the device can identify the feature points of the respective first calibration patterns in the same first calibration block, and after determining the calibration coordinate system according to the positioning identifier in the same first calibration block, can determine the corresponding positions of the respective feature points in the calibration coordinate system. Since the arrangement of the first calibration patterns in the same first calibration block is preset, the distances between the feature points of the respective first calibration patterns can also be determined according to the corresponding first calibration patterns. The distances between respective adjacent feature points can be determined according to positions of the feature points in the respective first calibration patterns. In the captured first image, according to coordinate positions of the pixels corresponding to the respective first calibration patterns in the calibration coordinate system, coordinate positions of the pixels corresponding to the respective feature points in the calibration coordinate system can be determined, and thus pixel distances between the respective feature points can be calculated. According to the distances between the respective feature points and the pixel distances, the transformation matrix of the internal and external parameters of the CCD camera can be calculated. By photographing the first calibration patterns uniformly arranged on the calibration component, the transformation matrix of the internal and external parameters of the CCD camera can be obtained according to the first image and the preset coordinate positions of the first calibration patterns, and thus when calibrating the CCD camera, there is no need to provide the actual product on the transport mechanism for operation, and thus the influence of product size errors on the calibration results is avoided and the accuracy of the calibration results is improved.

In S410, the calibration component can be disposed on the transport mechanism and travel at the first travelling rate on the conveyor belt of the transport mechanism. The device can control the CCD camera to photograph the calibration component when it is travelling to obtain the first image.

In S420, the first image captured by the CCD camera includes at least one first calibration block, and each first calibration block on the calibration component includes a positioning identifier and multiple first calibration patterns. After obtaining the first image, the device can identify the respective first calibration patterns in the same first calibration block from the first image, and determine corresponding feature points thereof according to the respective first calibration patterns. The first calibration patterns may be formed as polygons, circles, rings, ellipses, etc. For example, when the first calibration patterns are formed as triangles, the corresponding feature points may be centers of gravity, outer centers, perpendicular centers, inner and outer centers of the triangles; when the first calibration patterns are formed as circles, the corresponding feature points may be centers of the circles. The positioning identifier can be a triangular pattern, and the device can position the directions of the calibration coordinate system according to the corresponding pattern of the positioning identifier in the first image.

In S430, after determining the feature points corresponding to the respective first calibration patterns in the same first calibration block, the device can determine the calibration coordinate system in the first image according to the position of the positioning identifier in said first calibration block in the first image. After determining the calibration coordinate system, the device can determine the coordinate positions of the respective feature points in the calibration coordinate system according to the corresponding pixels of the respective feature points in the first image. The coordinate positions of the feature points in the calibration coordinate system refers to the pixel coordinates of the feature points.

In S440, after determining the coordinate positions of the feature points of the respective first calibration patterns belonging to the same first calibration block in the calibration coordinate system, the device can determine the distances between respective adjacent feature points It can be understood that in the above-mentioned calibration component, the multiple first calibration patterns in the same first calibration block are preset, and after determining the coordinate positions of the respective first calibration patterns in the calibration coordinate system, the distance between any two first calibration patterns can be determined. For example, if the multiple first calibration patterns in the same first calibration block are arranged in an M*N array, when it is determined that two adjacent first calibration patterns are located in the same row according to the coordinate positions of the respective first calibration patterns in the calibration coordinate system, it can be determined that the distance between the two adjacent first calibration patterns is a column distance. When it is determined that two adjacent first calibration patterns are located in the same column, it can be determined that the distance between the two adjacent first calibration patterns is a row distance. Similarly, after determining the distance between adjacent two first calibration patterns, the device can determine the distance between adjacent two feature points according to the positions of the feature points in the first calibration patterns. For example, when the first calibration patterns are formed as circles and the feature points are the centers of the circles, for two adjacent circles in the same row, the distance between the two centers is the sum of a distance between the two circles and the radius of the two circles.

In S450, after determining the feature points corresponding to the respective first calibration patterns belonging to the same first calibration block in the first image, the device can determine the pixel distances between the respective feature points according to the corresponding pixel coordinates of the feature points in the calibration coordinate system. Moreover, according to the arrangement manner of the respective first calibration patterns, the distances between the respective feature points can be determined. Based on the distances between the respective feature points and the pixel distances between the respective feature points, the transformation matrix of the internal and external parameters of the CCD camera can be calculated.

As an optional embodiment, referring to FIG. 5, in order to verify the calculated transformation matrix, after S450, the method further includes step of:

S510, obtaining a second image, wherein the second image is an image obtained by photographing a verification strip with the CCD camera after the calibration component is replaced with the verification strip and when the verification strip travels at a second travelling rate, and wherein multiple stripes distributed at equal intervals are provided on the verification strip;

S520, determining measurement distances between respective adjacent stripes according to positions of the stripes in the second image and the transformation matrix; and S530, verifying the transformation matrix of the CCD camera according to the measurement distances and a standard distance between adjacent stripes.

In the present embodiment, when the calibration component is travelling on the transport mechanism at the first travelling rate, the device can control the CCD camera to photograph the calibration component and calculate the transformation matrix of the internal and external parameters of the CCD camera according to the captured first image. After generating the transformation matrix of the internal and external parameters of the CCD camera, the calibration component on the transport mechanism can be replaced with the verification strip, and when the verification strip travels at the second travelling speed on the transport mechanism, the CCD camera is controlled to photograph the verification strip, and the verification is performed according to the captured second image, so as to verify whether the transformation matrix of the CCD camera meets the accuracy requirements or not.

In S510, after controlling the CCD camera to photograph the calibration component on the transport mechanism, the device can replace the calibration component with the verification strip, which can be provided with multiple stripes distributed at equal intervals. When the verification strip travels at the second travelling speed on the transport mechanism, the device can control the CCD camera to photograph the verification strip to obtain the second image.

It can be understood that in order to ensure the accuracy of the CCD camera when photographing the calibration component and verification strip, the first and second travelling rates can be the same, that is, the travelling rates of the calibration component and verification strip on the transport mechanism are the same, so as to avoid pixel errors between the captured first and second images caused by different travelling rates of the calibration component and verification strip travelling on the transport mechanism. Specifically, the first and second operating rates can be set to 3 m/min.

In S520, after obtaining the second image, the device can identify the respective stripes from the second image and determine the corresponding pixel positions of the respective stripes in the second image. The pixel distance between adjacent stripes can be determined based on the pixel positions of adjacent stripes, and by using the transformation matrix obtained during the above-mentioned calibration process and the pixel distance between adjacent stripes, the measurement distances between adjacent stripes can be calculated.

In S530, since the multiple stripes on the verification strip are distributed at equal intervals and the distance between adjacent stripes is a preset standard distance, the device can directly obtain this standard distance and compare it with the measurement distances to verify whether the transformation matrix of the internal and external parameters of the CCD camera meets the accuracy requirements.

As an optional embodiment, referring to FIG. 6, in order to determine the measurement distances of adjacent stripes, the above-mentioned S520 may include steps of:

S610, determining coordinate positions of the pixels of the respective stripes in the calibration coordinate system based on the positions of the stripes in the second image; and S620, calculating the measurement distances between adjacent stripes based on the coordinate positions of the pixels of the respective stripes in the calibration coordinate system and the transformation matrix.

In the present embodiment, the device can determine the coordinate positions of the pixels of the respective stripes in the calibration coordinate system according to the positions of the stripes in the second image, can determine the pixel distances between adjacent stripes, i.e. the number of pixels, according to the coordinate positions of the pixels of the respective stripes, and can convert the pixel distances between adjacent stripes into the measurement distances between adjacent stripes through the transformation matrix obtained by photographing the calibration component with the CCD camera as mentioned above.

In S610, the device can identify the stripes in the second image and then determine the coordinate positions of the pixels of the respective stripes in the calibration coordinate system according to the positions of the respective stripes in the second image. The coordinate positions are the corresponding pixel coordinates of the respective stripes.

In S620, after determining the coordinate positions of the pixels of the respective stripes in the calibration coordinate system, the device can determine the pixel distances between adjacent stripes according to the corresponding pixel coordinates of the respective stripes. It can be understood that the pixel distance between adjacent stripes may be a pixel distance between two adjacent sides of two adjacent stripes. The device can further determine the corresponding feature points of the respective stripes, and the pixel distance between adjacent stripes can further be a pixel distance between the feature points of two adjacent stripes. After determining the pixel distances between adjacent stripes, the measurement distances between adjacent stripes can be calculated according to the pixel distances between adjacent stripes and the transformation matrix of the CCD camera.

As an optional embodiment, referring to FIG. 7, in order to verify whether the transformation matrix meets the requirements, the above-mentioned S530 can include steps of:

S710, calculating calibration errors according to the standard distance and the measurement distances between adjacent stripes;

S720, comparing the respective calibration errors with a preset error threshold;

S730, determining that the transformation matrix has not passed the verification if the number of calibration errors greater than the preset error threshold among the respective calibration errors, reaches a preset verification threshold.

In the present embodiment, the device can obtain the calibration errors according to the standard distance and measurement distances of adjacent stripes, and can verify the transformation matrix obtained by the present calibration according to the calibration errors and the preset error threshold. If the transformation matrix has passed the verification, the calibration process ends and the transformation matrix is stored. If the transformation matrix fails to pass the verification, a verification failure message will be sent to the user and the CCD camera will be recalibrated. By setting the verification strip for verification, the transformation matrix obtained by the CCD camera calibration can meet the accuracy requirements.

In S710, the device can calculate the corresponding calibration errors of the respective adjacent stripes after obtaining the measurement distances between the respective adjacent stripes and standard distance. The calibration errors can be differences of the measurement distance from the standard distance.

In S720, after calculating the corresponding calibration errors of the respective adjacent stripes, the device can compare the respective calibration errors with the preset error threshold and determine whether the respective calibration errors are greater than the preset error threshold.

In S730, when sequentially comparing the multiple calibration errors with the preset error threshold, the device can make a count when one calibration error is determined to be greater than the preset error threshold so as to count the number of calibration errors greater than the preset error threshold. When the count value reaches the preset verification threshold, it is indicated that the transformation matrix has significant errors in multiple different positions and cannot accurately calibrate the product, and the device can determine that the transformation matrix calculated in the present calibration process fails to pass the verification.

It can be understood that after comparing all the calibration errors corresponding to the respective adjacent stripes with the preset error threshold, if the number of calibration errors greater than the preset error threshold does not reach the preset verification threshold, it is indicated that the calibration accuracy of the transformation matrix is high, and in this case, the device can determine that the transformation matrix calculated in the present calibration process has passed the verification.

In an optional embodiment, the device can further determine whether the transformation matrix has passed the verification according to the number of consecutive calibration errors greater than the preset error threshold. For example, when multiple consecutive calibration errors are all greater than the preset error threshold, it can be judged whether the number of the consecutive errors reaches the preset verification threshold. For example, when the preset error threshold is 0.05, it can be judged whether there are at least four consecutive calibration errors that are greater than the preset error threshold. If there are at least four consecutive calibration errors that are greater than 0.05, it can be determined that the transformation matrix fails to pass the verification.

As an optional embodiment, referring to FIG. 8, in order to reduce the times of verification and improve efficiency of verification, before S510, the method may further include steps of:

S810, calculating a distortion parameter fitting curve of the CCD camera according to the coordinate positions of the respective feature points in the first image in the calibration coordinate system; and

S820, determining a fitting accuracy of the distortion parameter fitting curve according to the coordinate positions of the respective feature points in the first image in the calibration coordinate system and the distortion parameter fitting curve;

The above-mentioned S510 may include a step of:

S830, obtaining a second image when the fitting accuracy reaches a preset accuracy threshold.

In the present embodiment, after photographing the calibration component with the CCD camera and calculating the transformation matrix of the CCD camera, the device can further calculate and generate the distortion parameter fitting curve of the CCD camera according to the respective feature points in the first image, and determine the fitting accuracy of the distortion parameter fitting curve. When the fitting accuracy meets preset requirements, the calibration component can be replaced with the verification strip and the second image is captured for verification. If the fitting accuracy of the distortion parameter fitting curve does not meet the preset requirements, there is no need to replace the calibration component with the verification strip, and it can be directly determined that the transformation matrix does not meet the calibration accuracy requirements. In this case, the calibration component can be redisposed on the transport mechanism and the first image can be recaptured for calibration. Before verification through the verification strip, the transformation matrix can be directly filtered according to the fitting accuracy of the distortion parameter fitting curve of the CCD camera, and if the preset requirements are not met, it can be directly determined that the transformation matrix obtained in the present calibration process does not meet the calibration accuracy requirements, without the need of additionally providing the verification strip for verification, thereby reducing the times of verification and improving the efficiency of verification.

In S810, after determining the coordinate positions of the respective feature points in the calibration coordinate system, the device can determine the pixel coordinates corresponding to the respective feature points. Since the CCD camera is a line scanning camera, different distortion parameters correspond to different positions of the CCD camera. According to the pixel coordinates corresponding to the respective feature points and the pixel distances between adjacent feature points, the distortion parameters corresponding to different positions of the line scanning camera can be determined.

The device can generate multiple samples according to the distortion parameters corresponding to different positions in the CCD camera, and perform the curve fitting according to the multiple samples to obtain a fitting curve between the positions and the distortion parameters, and this fitting curve is the distortion parameter fitting curve of the CCD camera.

In S820, after determining the distortion parameter fitting curve of the CCD camera, the fitting accuracy of the distortion parameter fitting curve can be determined according to the coordinate positions of the respective feature points in the first image in the calibration coordinate system and the distortion parameter fitting curve. For example, goodness of fit can be used to characterize the fitting accuracy of the distortion parameter fitting curve. Statistical magnitude of the goodness of fit is determination coefficient of the distortion parameter fitting curve.

The determination coefficient is calculated as follows:

determining a sample dataset as: (x1, y1), (x2, y2), . . . , (xn, yn), wherein x1, x2, xn respectively represent the coordinates of different positions of the CCD camera, and y1, y2, . . . , yn respectively represent the distortion parameters corresponding to the coordinates of different positions.

obtaining the distortion parameter fitting curve of the CCD camera by curve fitting, for x1, x2, . . . , xn, the corresponding fitting predicted distortion parameter values are $$\breve{y}1, \breve{y}2, \ldots, \breve{y}n.$$

an average value of the fitting predicted distortion parameters:

$$\bar{y} = \frac{1}{n}(\breve{y}1 + \breve{y}2 + \ldots + \breve{y}n);$$

residuals of the fitting predicted distortion parameters:

$$e_i = y_i - \breve{y}_i,$$

a total sum of squares:

$$SS_{tot} = \Sigma_i(y_i - \bar{y})^2,$$

a sum of squared residuals:

$$SS_{res} = \Sigma_i(y_i - \breve{y}_i)^2, \text{ and}$$

the determination coefficient:

$$R^2 = 1 - \frac{SS_{res}}{SS_{tot.}}$$

That is, when the goodness of fit is used to characterize the fitting accuracy of the distortion parameter fitting curve, the determination coefficient of the distortion parameter fitting curve can be calculated according to the distortion parameter fitting curve and the samples corresponding to the respective feature points.

In S830, after calculating the fitting accuracy of the distortion parameter fitting curve, the fitting accuracy of the distortion parameter fitting curve can be compared with a preset accuracy threshold, when the fitting accuracy reaches the preset accuracy threshold, it can be determined that the distortion parameter fitting curve has a relatively high fitting degree, and the calibration component can be replaced with a verification strip to perform the verification process of the CCD camera calibration.

For example, when the goodness of fit is used to characterize the fitting accuracy of the distortion parameter fitting curve, the preset accuracy threshold can be set to 0.95, and after the determination coefficient of the distortion parameter fitting curve is calculated, it can be judged whether the determination coefficient is greater than the preset accuracy threshold. When the determination coefficient reaches the preset accuracy threshold, the calibration component can be replaced with the verification strip and the transformation matrix can be verified. If the determination coefficient is less than the preset accuracy threshold, the verification process will not be performed and the CCD camera will be recalibrated.

Figure 10:
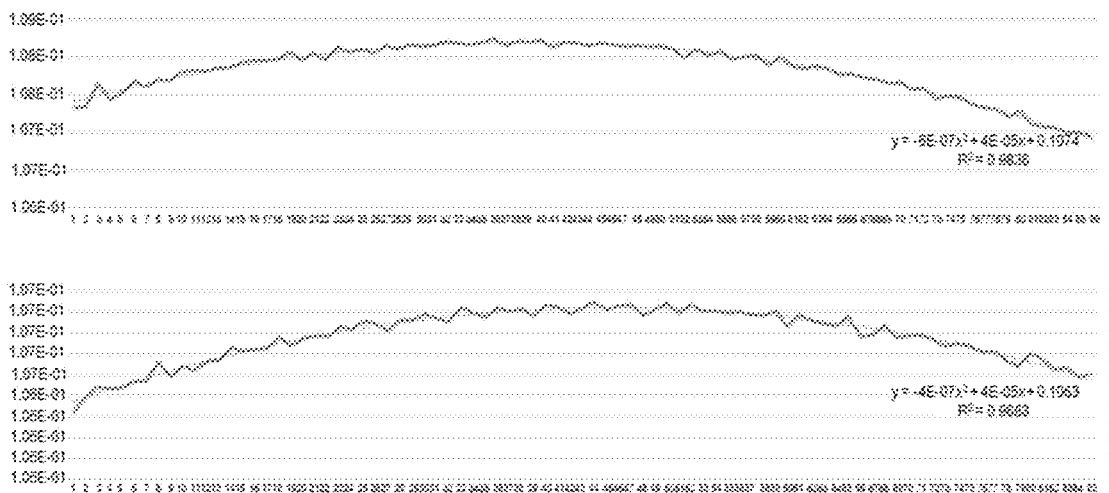
FIG. 10 is a view of a distortion parameter fitting curve of a CCD camera in an embodiment of the present application.

When multiple CCD cameras are provided next to the transport mechanism, the distortion parameter fitting curve of each CCD camera can be generated by fitting the distortion parameters of respective positions in each CCD camera, and the fitting accuracy can be calculated according to the distortion parameter fitting curve. As shown in FIG. 10, two CCD cameras are selected from the multiple CCD cameras, and the fitting accuracies of the distortion parameter fitting curves for the two CCD cameras are calculated to be 0.9836 and 0.9683, respectively. In the case that the preset accuracy threshold is set to 0.95, the fitting accuracies of the distortion parameter fitting curves corresponding to the two CCD cameras are both greater than the preset accuracy threshold, and thus it can be determined that the distortion parameter fitting curves of the two CCD cameras meet the accuracy requirements, the verification strip can be further provided and verifications can be performed by photographing the verification strip with the CCD cameras.

As an optional embodiment, referring to FIG. 9, in order to achieve a quick and rough positioning, the above-mentioned calibration pattern unit can further include a second calibration block, which is disposed on one side of the first calibration block in the width direction of the calibration component; and before S420, the method may further include a step of:

S910, positioning the first calibration block belonging to the same calibration pattern unit according to information of the second calibration block in the first image.

In the present embodiment, the device can quickly identify the pattern of the second calibration block from the first image after obtaining the first image, and determine directions of the calibration coordinate system based on the pattern so as to achieve a rough positioning of coordinates.

The second calibration block can be formed into a rectangular pattern, and the color of the pattern can be black. Compared to the first calibration block that includes the positioning identifier and multiple first calibration patterns, the device can identify the second calibration block from the first image more quickly, thereby achieving a quick and rough positioning.

As an optional embodiment, in the CCD camera calibration system, multiple CCD cameras can be disposed respectively at multiple positions next to the transport mechanism, and when the calibration component is disposed on the conveyor belt of the transport mechanism and travels, the images captured by the CCD cameras can be monitored; in the case that all of the multiple CCD cameras have captured images of the calibration pattern units on the calibration component, the transport mechanism can be controlled to stop running, and in this case, the image captured by each CCD camera can be checked, and it is judged whether the image captured by the CCD camera contains a complete calibration pattern unit, and whether the substrate and the first calibration block can be identified according to the image captured by the CCD camera. For example, the device can preset a range of grayscale difference between the substrate and the first calibration block, and if the difference between the grayscale of the substrate and the grayscale of the first calibration block in the captured image meets the range of grayscale difference, it can be determined that the device can identify the substrate and the first calibration block from the image, thereby achieving the CCD camera calibration. If the difference between the grayscale of the substrate and the grayscale of the first calibration block in the captured image is too small, it is necessary to adjust the substrate color of the calibration component or the pattern color of the first calibration block so that the difference between the grayscale of the substrate and the grayscale of the first calibration block meets the grayscale difference range. For example, the grayscale difference range can be set to a difference of more than 30 between the grayscale of the substrate and the grayscale of the first calibration block, and the grayscale of the first calibration block is lower than the grayscale of the substrate.

Based on the CCD camera calibration method provided in the above embodiments, correspondingly, the present application further provides specific implementations of the CCD calibration device, which refer to the following embodiments.

Figure 11:
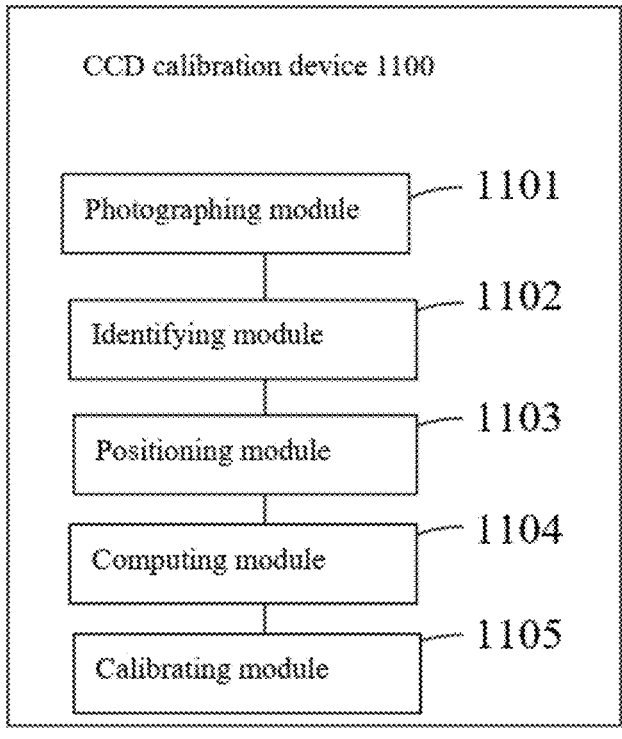
FIG. 11 is a structural schematic diagram of a CCD calibration device provided in an embodiment of the present application.

Referring to FIG. 11 at first, the CCD calibration device 1100 provided in the embodiments of the present application includes the following modules:

a photographing module 1101 for obtaining a first image, wherein the first image is an image obtained by photographing a calibration component with a CCD camera when the calibration component is travelling at a first travelling rate on a transport mechanism;

an identifying module 1102 for identifying feature points in respective first calibration patterns belonging to the same first calibration block from the first image;

a positioning module 1103 for determining coordinate positions of the feature points in the respective first calibration patterns belonging to the same first calibration block in a calibration coordinate system, wherein the calibration coordinate system is determined according to a position of a positioning identifier in the first image;

a calculating module 1104 for determining distances between respective adjacent two feature points according to positions of the feature points in the respective first calibration patterns belonging to the same first calibration block; and a calibrating module 1105 for obtaining a transformation matrix of internal and external parameters of the CCD camera according to the distances and the coordinate positions of respective feature points in the first image in the calibration coordinate system.

In the present embodiment, the device can control the CCD camera to photograph the calibration component to obtain the first image, and the device can identify the feature points of the respective first calibration patterns in the same first calibration block, and determine the corresponding positions of the respective feature points in the calibration coordinate system after determining the calibration coordinate system according to the positioning identifier in said same first calibration block. Since the distance between the first calibration patterns in the same first calibration block can be preset, the distance between the feature points of the respective first calibration patterns can also be predetermined. The distance between each adjacent feature points can be determined according to the positions of the feature points in the respective first calibration patterns. In the captured first image, according to the coordinate positions of the pixels corresponding to the respective first calibration patterns in the calibration coordinate system, the coordinate positions of the pixels corresponding to the respective feature points in the calibration coordinate system can be determined, and thus the pixel distances between the respective feature points can be calculated. According to the distances and the pixel distances between the respective feature points, the transformation matrix of the internal and external parameters of the CCD camera can be calculated. By photographing the first calibration patterns that are uniformly arranged on the calibration component, the transformation matrix of the internal and external parameters of the CCD camera can be obtained according to the first image and the preset coordinate positions of the first calibration patterns, and thus when calibrating the CCD camera, there is no need to dispose the actual product on the transport mechanism for operation, thereby avoiding the influence of product size errors on the calibration results and improving the accuracy of the calibration results.

As an implementation of the present application, in order to verify the calculated transformation matrix, the CCD calibration device 1100 as mentioned above may further include:

a second photographing module for obtaining a second image, wherein the second image is an image obtained by photographing the verification strip with the CCD camera when the calibration component is replaced by the verification strip and the verification strip travels at a second travelling rate, wherein multiple stripes distributed at equal intervals are provided on the verification strip;

a second calculating module for determining the measurement distances between adjacent stripes according to the positions of the stripes in the second image and the transformation matrix; and a verifying module for verifying the transformation matrix of the CCD camera according to the measurement distances and the standard distance between adjacent stripes.

As an implementation of the present application, in order to determine the measurement distances between adjacent stripes, the second calculating module as mentioned above may further include:

a coordinate unit for determining the coordinate positions of pixels of the respective stripes in the calibration coordinate system according to the positions of the stripes in the second image; and a calculating unit for calculating the measurement distances between adjacent stripes according to the coordinate positions of the pixels of the respective stripes in the calibration coordinate system and the transformation matrix.

As an implementation of the present application, in order to verify whether the transformation matrix meets the requirements, the above-mentioned verifying module may further include:

an error unit for calculating the calibration errors according to the standard distance and the measurement distances between adjacent stripes;

a comparison unit for comparing the respective calibration errors with a preset error threshold; and a verifying unit for determining that the transformation matrix fails to pass the verification when the number of calibration errors greater than the preset error threshold among the respective calibration errors reaches the preset verification threshold.

As an implementation of the present application, in order to reduce times of the verification and improve efficiency of the verification, the CCD calibration device 1100 may further include:

a fitting module for calculating the distortion parameter fitting curve of the CCD camera according to the coordinate positions of the respective feature points in the first image in the calibration coordinate system; and an accuracy module for determining the fitting accuracy of the distortion parameter fitting curve according to the coordinate positions of the respective feature points in the first image in the calibration coordinate system and the distortion parameter fitting curve, and the second photographing module as mentioned above is further adapted to obtain the second image when the fitting accuracy reaches the preset accuracy threshold.

As an implementation of the present application, in order to achieve a quick and rough positioning, the above-mentioned calibration pattern unit can further include a second calibration block, which is disposed on one side of the first calibration block in the width direction of the calibration component, and the identifying module 1102 is further adapted to position the first calibration block belonging to the same calibration pattern unit according to the information of the second calibration block in the first image.

The CCD calibration device 1000 provided in the embodiments of the present application can achieve the various steps in the method embodiments of FIGS. 4 to 9, and to avoid repetition, the specific details will not be repeated here.

Figure 12:
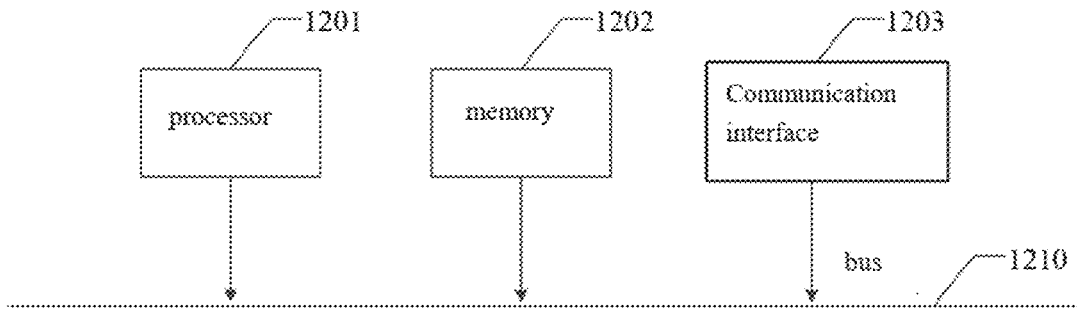
FIG. 12 is a schematic diagram of a hardware structure of a computing device provided in an embodiment of the present application.

FIG. 12 shows a schematic diagram of a hardware structure of a computing device provided in the embodiments of the present application.

The computing device may include a processor 1201 and a memory 1202 for storing computer program instructions.

Specifically, the aforementioned processor 1201 may include a central processing unit (CPU), or an Application Specific Integrated Circuit (ASIC), or may be configured to implement one or more integrated circuits of the embodiments of the present application.

The memory 1202 may include a large capacity memory for data or instructions. For example, rather than limiting, the memory 1202 may include a hard disk drive (HDD), a floppy drive, a flash drive, an optical disk, a magneto-optical disk, a magnetic tape, or a Universal Serial Bus (USB) drive, or a combination of two or more of the above. In appropriate cases, the memory 1202 may include removable or non-removable (or fixed) medium. In appropriate cases, the memory 1202 may be located inside or outside an integrated gateway disaster recovery device. In a specific embodiment, the memory 1202 is a nonvolatile solid-state memory.

The memory may include a read-only memory (ROM), a random access memory (RAM), a disk storage medium device, an optical storage medium device, a flash memory device, an electrical, optical, or other physical/tangible memory storage device. Therefore, typically, the memory includes one or more tangible (non-transient) computer-readable storage medium (such as a memory device) encoded with software that includes computer executable instructions, and when the software is executed (such as by one or more processors), it is operable to perform operations described with reference to the method according to one aspect of the present disclosure.

The processor 1201 reads and executes the computer program instructions stored in the memory 1202 to implement any CCD camera calibration method in the above embodiments.

In one example, the computing device may further include a communication interface 1203 and a bus 1210. As shown in FIG. 12, the processor 1201, the memory 1202, and the communication interface 1203 are connected and communicated with each other through the bus 1210.

The communication interface 1203 is mainly adapted to achieve the communication among various modules, devices, units, and/or devices in the embodiments of the present application.

The bus 1210 includes hardware, software, or both, which couples the components of the computing device together. For example, rather than limiting, the bus may include an Accelerated Graphics Port (AGP) or other graphics bus, an Enhanced Industry Standard Architecture (EISA) bus, a Front End Bus (FSB), a Hypertransmission (HT) interconnection, an Industry Standard Architecture (ISA) bus, an Infinite Bandwidth interconnection, a Low Pin Count (LPC) bus, a Memory bus, a Microchannel Architecture (MCA) bus, a Peripheral Component Interconnect (PCI) bus, a PCI-Express (PCI-X) bus, a Serial Advanced Technology Attachment (SATA) bus, a Video Electronics Standards Association Local (VLB) bus, or other suitable bus, or a combination of two or more of the above. Where appropriate, the bus 1210 may include one or more buses. Although the embodiments of the present application describe and illustrate specific buses, any suitable buses or interconnections can be considered in the present application.

The computing device can implement the CCD camera calibration method and device described in combination with FIGS. 1 to 6 based on the above embodiments.

Further, in combination with the CCD camera calibration method in the above embodiments, the embodiments of the present application can provide a computer storage medium for implementation. The computer storage medium stores computer program instructions; and when the computer program instructions are executed by the processor, any of the CCD camera calibration methods in the above embodiments can be implemented, and the same technical effect can be achieved. To avoid repetition, the specific details will not be repeated here. The above-mentioned computer-readable storage medium may include non-transient computer-readable storage medium, such as a Read-Only Memory (ROM), a Random Access Memory (RAM), a magnetic disk or an optical disk, etc., which are not limited herein.

It should be clarified that the present application is not limited to the specific configurations and processes described above and shown in the figures. For simplicity, detailed descriptions of known methods have been omitted here. In the above embodiments, several specific steps are described and shown as examples. However, the method process of the present application is not limited to the specific steps described and shown, and the person skilled in the art can make various changes, modifications, additions, or change the order between steps after understanding the spirit of the present application.

The functional blocks shown in the above structural block diagram can be implemented as hardware, software, firmware, or a combination thereof. When implemented in hardware, it can be, for example, electronic circuits, specialized integrated circuits (ASICs), appropriate firmware, plugins, function cards, and so on. When implemented in software, the elements of the present application are programs or code segments used to execute the required tasks. The programs or code segments can be stored in the machine readable medium, or transmitted on transmission medium or communication links through data signals carried by carrier waves. The "machine readable medium" can include any medium capable of storing or transmitting information. Examples of the machine readable medium include electronic circuits, semiconductor memory devices, ROMs, flash memories, erasable ROMs (EROMs), floppy disks, CD-ROMs, optical disks, hard drives, fiber optic medium, radio frequency (RF) links, and so on. The code segments can be downloaded through computer networks such as the Internet and intranet.

It should further be noted that the exemplary embodiments mentioned in the present application describe some methods or systems based on a series of steps or devices. However, the present application is not limited to the order of the steps mentioned above, which means that the steps can be executed in the order mentioned in the embodiments, or different from the order in the embodiments, or multiple steps can be executed simultaneously.

Various aspects of the present disclosure are described above with reference to the flowcharts and/or block diagrams of the method, device, and computer program product according to the embodiments disclosed herein. It should be understood that each block in the flowcharts and/or block diagrams, as well as the combination of the respective blocks in the flowcharts and/or block diagrams, can be implemented by computer program instructions. These computer program instructions can be provided to processors of general-purpose computers, specialized computers, or other programmable data processing devices to generate a machine that the computer program instructions executed by processors of computers or other programmable data processing devices, enable the implementation of the functions/actions specified in one or more blocks of the flowcharts and/or block diagrams. The type of the processors can be, but is not limited to, general-purpose processors, specialized processors, special application processors, or field programmable logic circuits. It can further be understood that each block in the block diagrams and/or flowcharts, as well as a combination of blocks in the block diagrams and/or flowcharts, can be implemented by dedicated hardware that performs specified functions or actions, or by a combination of dedicated hardware and computer instructions.

The above contents are merely the specific implementations of the present application, and the person skilled in the art can clearly understand that for the convenience and conciseness of the description, the specific working processes of the systems, modules, and units described above can refer to the corresponding processes in the aforementioned method embodiments, and will not be repeated here. It should be understood that the scope of protection of the present application is not limited to this. Any technical personnel familiar with the technical field within the scope of present disclosure can easily think of various equivalent modifications or replacements, which should fall within the scope of protection of the present application.

What is claimed is:

1. A CCD camera calibration system, comprising:
a transport mechanism;
a calibration component, wherein the calibration component is disposed on the transport mechanism, a plurality of calibration pattern units are arranged in a length direction on the calibration component, each calibration pattern unit comprises a first calibration block, and the first calibration block comprises a positioning identifier and multiple first calibration patterns that are arranged uniformly;
a CCD camera for photographing the calibration component to obtain a first image while the calibration component is travelling;
a processing module, wherein the processing module is in communication connection with the CCD camera, and is adapted to calculate a transformation matrix of internal and external parameters of the CCD camera according to the first image; and
a verification strip adapted for replacing the calibration component after the transformation matrix of the internal and external parameters of the CCD camera is obtained, wherein multiple stripes distributed at equal intervals are provided on the verification strip.

2. The CCD camera calibration system according to claim 1, wherein the verification strip is a film with a white substrate, and the stripes are black stripes.

3. The CCD camera calibration system according to claim 1, wherein the calibration component comprises a calibration strip, the calibration strip comprises a white substrate, and the first calibration patterns is black in color.

4. The CCD camera calibration system according to claim 3, wherein the first calibration patterns are formed into circles.

5. The CCD camera calibration system according to claim 1, wherein the calibration pattern unit further comprises a second calibration block, which is disposed on one side of the first calibration block in a width direction of the calibration component.

6. The CCD camera calibration system according to claim 1, wherein the calibration pattern unit comprises multiple first calibration blocks arranged in a width direction of the calibration component; and the calibration component is adapted for being separated into multiple sub calibration components after being split in the transport mechanism, and each sub calibration component comprises at least one first calibration block.

7. A CCD camera calibration method, comprising:

obtaining a first image, wherein the first image is an image obtained by photographing a calibration component with a CCD camera when the calibration component is travelling at a first travelling rate on a transport mechanism, wherein the calibration component comprises a plurality of calibration pattern units arranged in a length direction, each calibration pattern unit comprising a first calibration block having a positioning identifier and multiple uniformly arranged first calibration patterns;

identifying feature points in respective first calibration patterns belonging to the same first calibration block from the first image;

determining coordinate positions of the feature points in the respective first calibration patterns belonging to the same first calibration block in a calibration coordinate system, wherein the calibration coordinate system is determined according to a position of a positioning identifier in the first image;

determining distances between respective adjacent two feature points according to positions of the feature points in the respective first calibration patterns belonging to the same first calibration block; and obtaining a transformation matrix of internal and external parameters of the CCD camera according the distances and the coordinate positions of the respective feature points in the first image in the calibration coordinate system, replacing the calibration component with a verification strip having multiple stripes distributed at equal intervals;

obtaining a second image by photographing the verification strip with the CCD camera while the verification strip travels on the transport mechanism;

determining measurement distances between respective adjacent stripes according to positions of the stripes in the second image and the transformation matrix; and verifying the transformation matrix of the CCD camera according to the measurement distances and a standard distance between adjacent stripes.

8. The CCD camera calibration method according to claim 7, wherein before obtaining the second image, the method further comprises:

calculating a distortion parameter fitting curve of the CCD camera according to the coordinate positions of the respective feature points in the first image in the calibration coordinate system; and determining a fitting accuracy of the distortion parameter fitting curve according to the coordinate positions of the respective feature points in the first image in the calibration coordinate system and the distortion parameter fitting curve;

the obtaining the second image comprises:

obtaining the second image when the fitting accuracy reaches a preset accuracy threshold.

9. The CCD camera calibration method according to claim 7, wherein the determining the measurement distances between respective adjacent stripes according to the positions of the stripes in the second image and the transformation matrix comprises:

determining coordinate positions of pixels of the respective stripes in the calibration coordinate system according to the positions of the stripes in the second image; and calculating the measurement distances between respective adjacent stripes according to the coordinate positions of the pixels of the respective stripes in the calibration coordinate system and the transformation matrix.

10. The CCD camera calibration method according to claim 7, wherein the verifying the transformation matrix of the CCD camera according to the measurement distances and the standard distance between adjacent stripes comprises:

calculating calibration errors according to the standard distance and respective measurement distances between adjacent stripes;

comparing respective calibration errors with a preset error threshold; and determining that the transformation matrix has not passed the verification, when a number of calibration errors greater than the preset error threshold among the respective calibration errors reaches a preset verification threshold.

11. The CCD camera calibration method according to claim 7, wherein the calibration pattern unit further comprises a second calibration block, which is disposed on one side of the first calibration block in a width direction of the calibration component; and before identifying the feature points in the respective first calibration patterns belonging to the same first calibration block from the first image, the method further comprises:

positioning the first calibration block belonging to the same calibration pattern unit according to information of the second calibration block in the first image.

12. The CCD camera calibration method according to claim 11, wherein the second calibration block is rectangular.

13. The CCD camera calibration method according to claim 7, wherein the first calibration patterns are formed into circles, and the feature points are at centers of the circles.

14. A CCD calibration device, comprising:

a photographing module for obtaining a first image, wherein the first image is an image obtained by photographing a calibration component with a CCD camera when the calibration component is travelling at a first travelling rate on a transport mechanism, wherein the calibration component comprises a plurality of calibration pattern units arranged in a length direction, each calibration pattern unit comprising a first calibration block having a positioning identifier and multiple uniformly arranged first calibration patterns;

an identifying module for identifying feature points in respective first calibration patterns belonging to the same first calibration block from the first image;

a positioning module for determining coordinate positions of the feature points in the respective first calibration patterns belonging to the same first calibration block in a calibration coordinate system, wherein the calibration coordinate system is determined according to a position of a positioning identifier in the first image;

a calculating module for determining distances between respective adjacent two feature points according to positions of the feature points in the respective first calibration patterns belonging to the same first calibration block; and a calibration module for obtaining a transformation matrix of internal and external parameters of the CCD camera according to the distances and the coordinate positions of respective feature points in the first image in the calibration coordinate system, a verification module configured to control replacement of the calibration component with a verification strip having multiple stripes distributed at equal intervals, obtain a second image of the verification strip, determine measurement distances between adjacent stripes using the transformation matrix, and verify the transformation matrix according to the measurement distances and a standard distance between adjacent stripes.

15. A computing device, comprising a processor and a memory for storing computer program instructions;

the processor implements the CCD camera calibration method according to claim 7 when executing the computer program instructions.

16. A non-transitory computer storage medium storing computer program instructions, wherein the computer program instructions when executed on a processor causes the processor to perform the CCD camera calibration method according to claim 7.

17. A CCD camera calibration system, comprising:

a transport mechanism;

a calibration component, wherein the calibration component is disposed on the transport mechanism, a plurality of calibration pattern units are arranged in a length direction on the calibration component, each calibration pattern unit comprises multiple first calibration blocks arranged in a width direction of the calibration component, and the first calibration block comprises a positioning identifier and multiple first calibration patterns that are arranged uniformly, the calibration component is adapted for being separated into multiple sub calibration components after being split in the transport mechanism, and each sub calibration component comprises at least one first calibration block;

a CCD camera for photographing the calibration component to obtain a first image while the calibration component is travelling; and a processing module, wherein the processing module is in communication connection with the CCD camera, and is adapted to calculate a transformation matrix of internal and external parameters of the CCD camera according to the first image.

* * * * *